(12) United States Patent
Kim et al.

(10) Patent No.: US 11,991,428 B2
(45) Date of Patent: May 21, 2024

(54) CAMERA MODULE INCLUDING A LENS ASSEMBLY INCLUDING A LIQUID LENS

(71) Applicant: LG INNOTEK CO., LTD., Seoul (KR)

(72) Inventors: Ui Jun Kim, Seoul (KR); Jung Bae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 154 days.

(21) Appl. No.: 17/753,956

(22) PCT Filed: Sep. 18, 2020

(86) PCT No.: PCT/KR2020/012615
§ 371 (c)(1),
(2) Date: Mar. 18, 2022

(87) PCT Pub. No.: WO2021/054760
PCT Pub. Date: Mar. 25, 2021

(65) Prior Publication Data
US 2023/0353849 A1    Nov. 2, 2023

(30) Foreign Application Priority Data

Sep. 18, 2019    (KR) ........................ 10-2019-0114991

(51) Int. Cl.
*H04N 5/335* (2011.01)
*G02B 3/14* (2006.01)
(Continued)

(52) U.S. Cl.
CPC .............. *H04N 23/52* (2023.01); *G02B 3/14* (2013.01); *H04N 23/65* (2023.01)

(58) Field of Classification Search
None
See application file for complete search history.

(56) References Cited

U.S. PATENT DOCUMENTS 8,487,228 B2 *   7/2013   Nunnink ................. G02B 3/14
                                                              250/216
11,194,221 B2 *  12/2021  Jang ..................... H04N 23/6812
(Continued)

FOREIGN PATENT DOCUMENTS

JP      2017-502816 A    1/2017
KR   10-2012-0035386 A   4/2012
(Continued)

OTHER PUBLICATIONS

International Search Report dated Dec. 23, 2020 in International Application No. PCT/KR2020/012615.

*Primary Examiner* — Gary C Vieaux
(74) *Attorney, Agent, or Firm* — Saliwanchik, Lloyd & Eisenschenk

(57) ABSTRACT

Disclosed in an embodiment is a camera module including a lens assembly including a liquid lens including a first liquid and a second liquid which form an interface therebetween, a voltage controller which applies a driving signal to the liquid lens to adjust the interface, a temperature sensor which detects temperature information of the liquid lens, an image sensor which receives light passing through the lens assembly, a sensing unit which detects information corresponding to the interface of the liquid lens, and a compensation unit which outputs feedback information to the voltage controller using the information corresponding to the interface of the liquid lens and the temperature information.

7 Claims, 13 Drawing Sheets

(51) Int. Cl.
*H04N 23/52* (2023.01)
*H04N 23/65* (2023.01)

(56) References Cited

U.S. PATENT DOCUMENTS 11,567,242 B2 * 1/2023 Kaminski ................ G02B 3/14
2018/0085213 A1    3/2018 Hadba et al.
2022/0317343 A1 * 10/2022 Karam ................ G02B 26/005

FOREIGN PATENT DOCUMENTS

KR    10-2018-0103536 A    9/2018
KR    10-2018-0114806 A    10/2018

* cited by examiner

CAMERA MODULE INCLUDING A LENS ASSEMBLY INCLUDING A LIQUID LENS

CROSS-REFERENCE TO RELATED APPLICATIONS

This application is the U.S. national stage application of International Patent Application No. PCT/KR2020/012615, filed Sep. 18, 2020, which claims the benefit under 35 U.S.C. § 119 of Korean Application No. 10-2019-0114991, filed Sep. 18, 2019, the disclosures of each of which are incorporated herein by reference in their entirety.

TECHNICAL FIELD

The present invention relates to a camera module.

BACKGROUND ART

A user of a portable device requires an optical device having a high resolution, a small size, and various image capturing functions. For example, the various image capturing functions may be one or more among an optical zoom function (zoom-in/zoom-out), an auto auto-focusing (AF) function, and an optical image stabilizer (OIS) function.

Conventionally, in order to realize the above-described various image capturing functions, several lenses are combined, and a method of moving the combined lenses is used. However, when the number of lenses increases, a size of the optical device may increase.

AF and OIS functions are performed by moving or tilting several lenses fixed to a lens holder and aligned along an optical axis in an optical axis direction or a direction perpendicular to the optical axis. To this end, a separate lens driving unit configured to drive a lens assembly including a plurality of lenses is required. However, the lens driving unit consumes high power, a cover glass for protecting the lens driving unit is additionally needed in addition to the camera module, and thus there is a problem of an increase in total size of the conventional camera module. In order to solve the problem, studies on a liquid lens part which performs AF and OIS functions by electrically adjusting a curvature of an interface between two liquids are being carried out.

However, since a shape of an interface of a liquid lens variously varies according to a temperature, accuracy thereof needs to be improved.

Technical Problem

The present invention is directed to providing a camera module, which includes a lens capable of adjusting a position of an interface positioned between two liquids according to electric energy, capable of compensating for a change in diopter due to deformation of an interface occurring according to a temperature of a structure which houses two liquids included in the lens.

In addition, the present invention is directed to providing a camera module capable of adjusting a driving voltage, which adjusts movement of an interface formed between two liquids, to correspond to a change in spatial frequency response (SFR) according to a change in temperature of a liquid lens in order to overcome a feature and a tendency of a decrease in a resolution of the liquid lens, of which a curvature, a deviation, and the like of the interface formed between two liquids included in the lens are adjusted according to a supplied voltage.

Objectives to be solved through the present invention are not limited to the above-described objectives and may include objectives and effects derived from solutions or embodiments of the objectives which will be described below.

Technical Solution

One aspect of the present invention provides a camera module including a lens assembly including a liquid lens including a first liquid and a second liquid which form an interface therebetween, a voltage controller which applies a driving signal to the liquid lens to adjust the interface, a temperature sensor which detects temperature information of the liquid lens, an image sensor which receives light passing through the lens assembly, a sensing unit which detects information corresponding to the interface of the liquid lens, and a compensation unit which outputs feedback information to the voltage controller using the information corresponding to the interface of the liquid lens and the temperature information.

The compensation unit may include a first input part which receives the information corresponding to the interface, a second input part which receives the temperature information, and a data part which stores a plurality of first driving signals for a first diopter of the liquid lens for each temperature and a plurality of second driving signals for a second diopter of the liquid lens for each temperature.

The first diopter and the second diopter may be different from each other.

The camera module may include a first calculating unit which calculates a third diopter of the liquid lens using the first driving signal, and a second calculating unit which calculates the feedback information corresponding to the temperature information and the third diopter using at least one of the plurality of first driving signals and the plurality of second driving signals, wherein the second calculating unit may calculate a first driving function for the plurality of first driving signals and a second driving function for the plurality of second driving signals.

The second calculating unit may calculate a plurality of third driving functions for each temperature from the first driving function and the second driving function.

The second calculating unit may calculate the feedback information using at least one of the first driving function, the second driving function, and the plurality of third driving functions.

The second calculating unit may calculate a fourth driving function which is a digital code for a temperature for each diopter using the plurality of third driving functions.

The fourth driving function may be provided as a plurality of fourth driving functions and may be a linear function.

The first driving function and the second driving function may be linear functions.

The liquid lens may include a plate including a cavity in which a conductive liquid and a nonconductive liquid are disposed with an interface formed therebetween, a common terminal disposed on the plate, and a plurality of individual terminals disposed under the plate, wherein the information corresponding to the interface of the liquid lens may include voltages or an average voltage applied to the plurality of individual terminals.

Advantageous Effects

According to embodiments of the present invention, a camera module which inhibits a decrease in resolution or accuracy occurring according to a change in an interface of a liquid lens is provided.

Various useful advantages and effects of the present invention are not limited to the above-described content, and will be more easily understood with description of specific embodiments of the present invention.

MODES OF THE INVENTION

Hereinafter, exemplary embodiments of the present invention will be described in detail with reference to the accompanying drawings.

However, the technical spirit of the present invention is not limited to the few embodiments which will be described and may be realized in a variety of different forms, and one or more components of the embodiments may be selectively combined, substituted, and used within the range of the technical spirit.

In addition, unless clearly and specifically defined otherwise by the context, all terms (including technical and scientific terms) used herein can be interpreted as having meanings generally understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on or under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
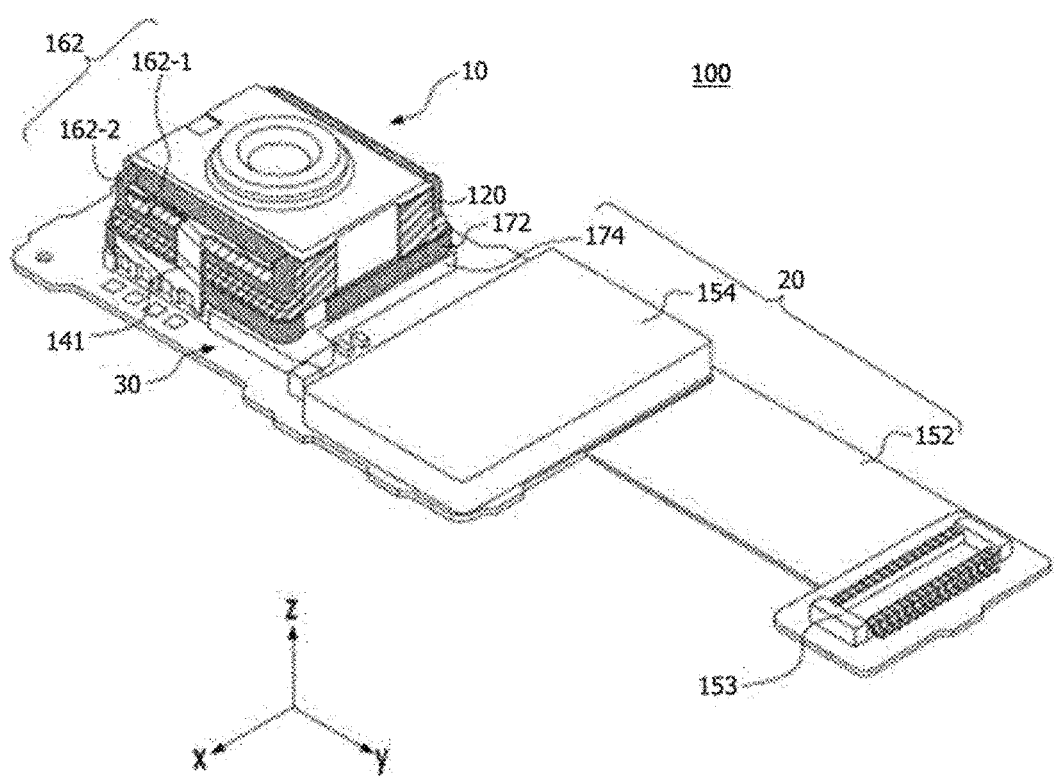
FIG. 1 is a schematic perspective view illustrating a camera module according to an embodiment.

FIG. 1 is a schematic perspective view illustrating a camera module according to an embodiment.

Referring to FIG. 1, a camera module 100 may include a lens assembly 10, a control circuit 20, and an image sensor 30.

First, the lens assembly 10 may include a plurality of lens parts and a holder for accommodating the plurality of lens parts. As will be described below, the plurality of lens parts may include a liquid lens and may further include a first lens part or second lens part. The plurality of lens parts may include the first and second lens parts and a liquid lens part.

The control circuit 20 serves to supply a driving voltage (or operating voltage) to the liquid lens part.

The control circuit 20 and the image sensor 30 may be disposed on one printed circuit board (PCB), but this is only one example and the embodiment is not limited thereto.

When the camera module 100 according to the embodiment is applied to an optical device (or optical instrument), a structure of the control circuit 20 may be designed to be different according to a specification required for the optical device. Particularly, the control circuit 20 may be implemented as a single chip and reduce a magnitude of a driving voltage applied to the lens assembly 10. Accordingly, a size of the optical device mounted on a portable device becomes smaller. This will be described in detail below.

Figure 2:
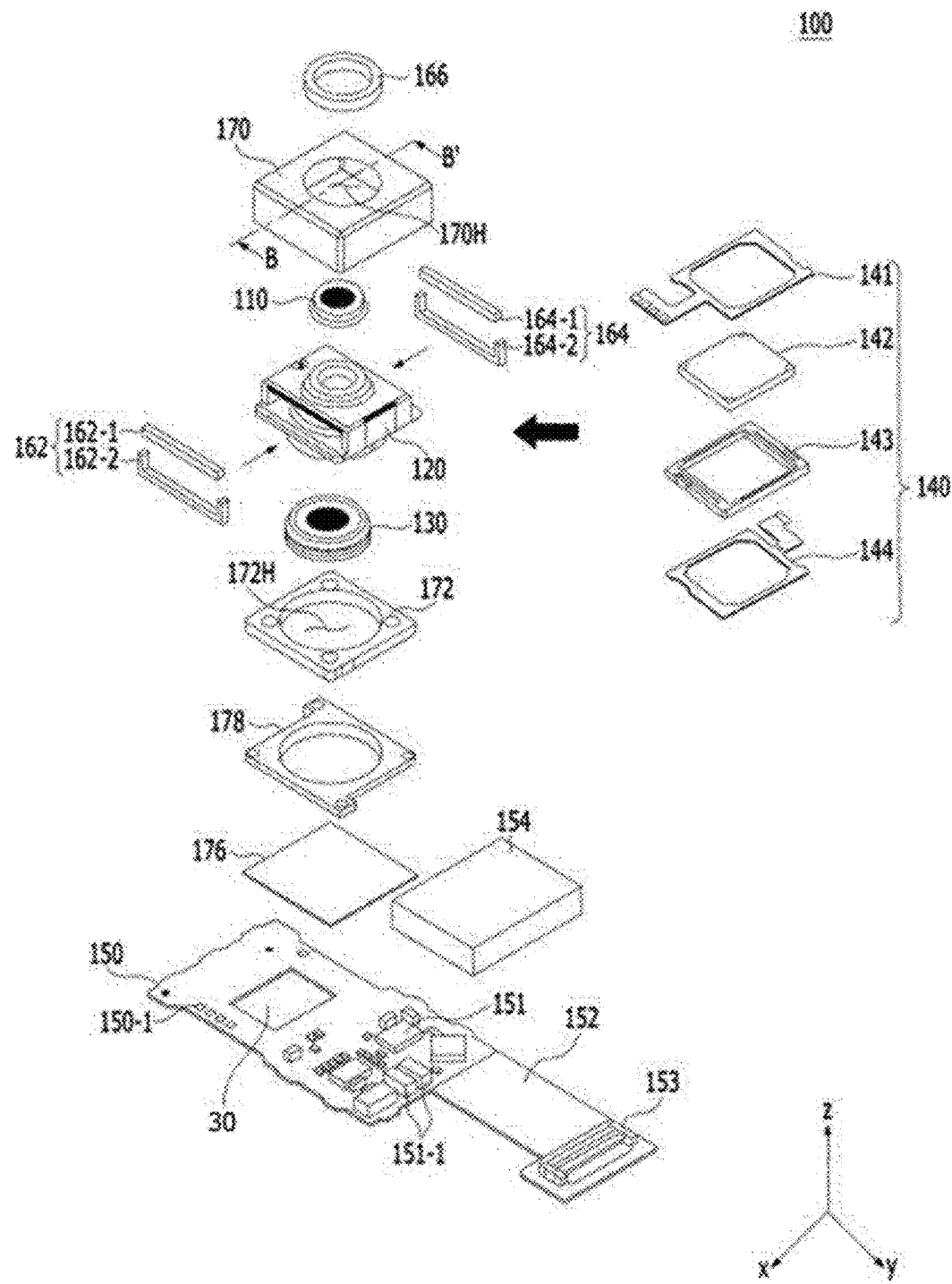
FIG. 2 is an exploded perspective view illustrating the camera module according to the embodiment.
Figure 3:
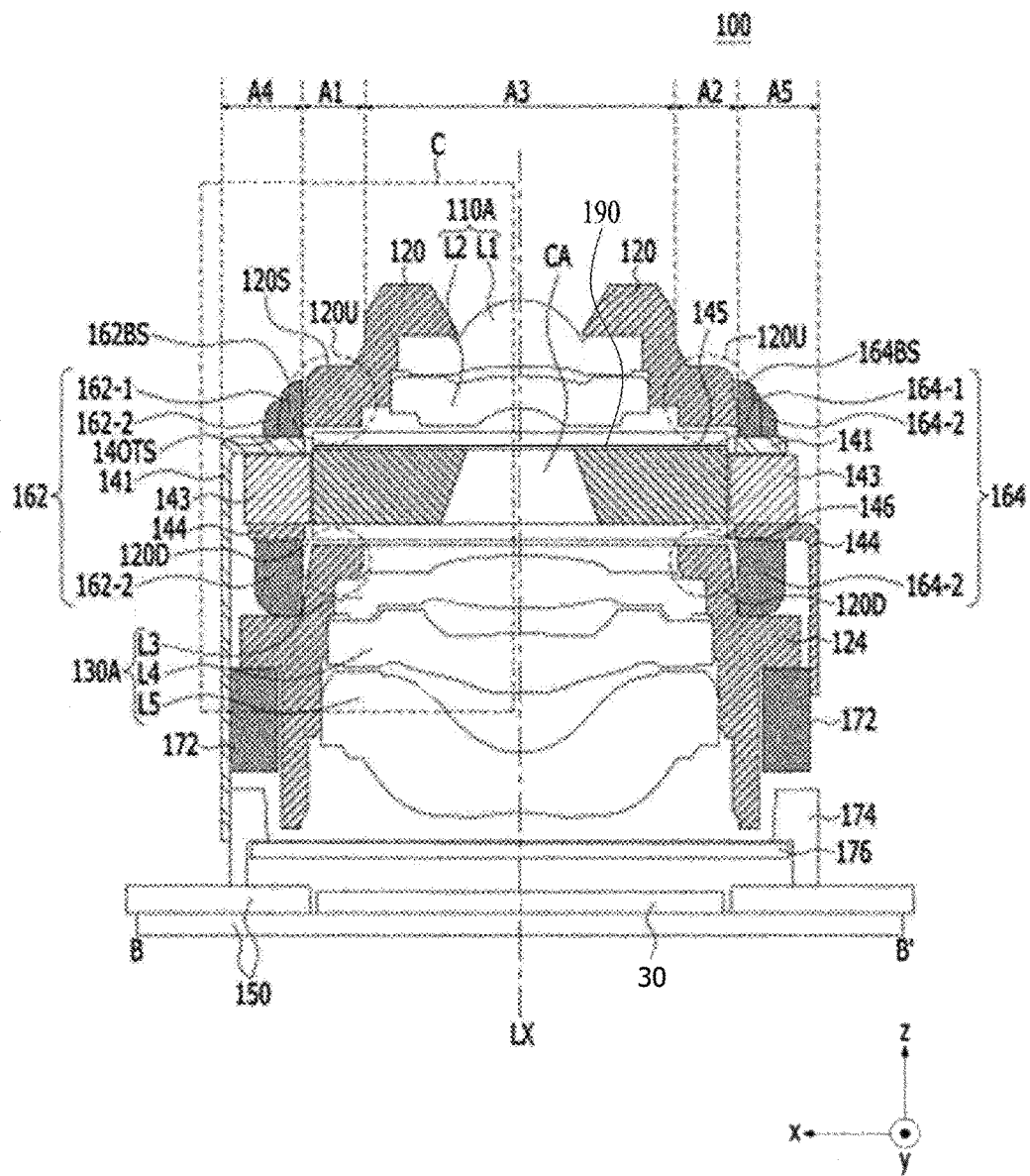
FIG. 3 is a cross-sectional view illustrating the camera module according to the embodiment.
Figure 4:
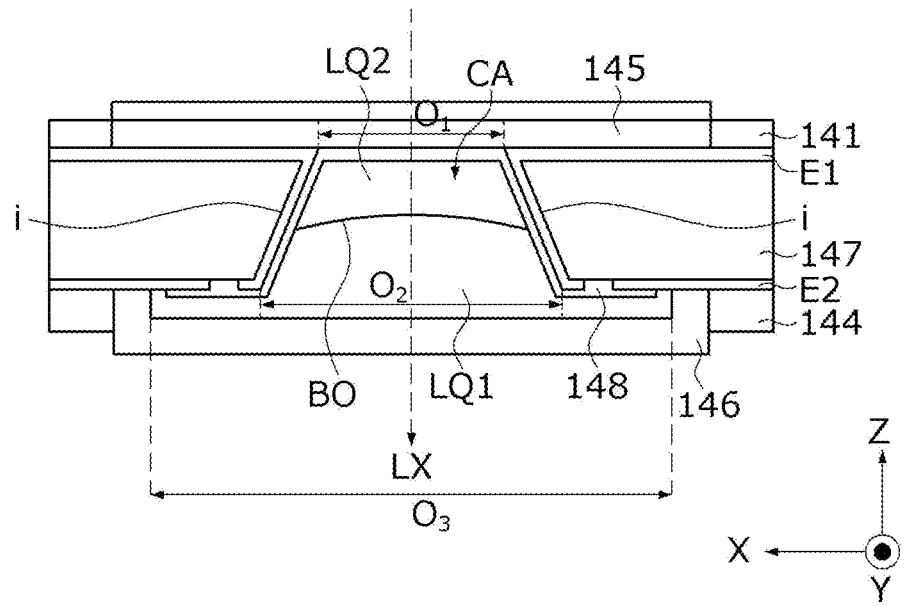
FIG. 4 is a cross-sectional view illustrating a liquid lens part according to the embodiment.

FIG. 2 is an exploded perspective view illustrating the camera module according to the embodiment, FIG. 3 is a cross-sectional view illustrating the camera module according to the embodiment, and FIG. 4 is a cross-sectional view illustrating the liquid lens part according to the embodiment.

Referring to FIGS. 2 and 3, the camera module 100 may include the lens assembly, a main substrate 150, and the image sensor 30. In addition, the camera module 100 may further include a first cover 170 and a middle base 172. In addition, the camera module 100 may further include one or more adhesive members 162 and 164 and a second cover 174. At least one adhesive member serves to couple or fix a liquid lens part 140 to a holder 120.

In this case, it is illustrated that one or more adhesive members include all of a first adhesive member 162, a second adhesive member 164, and a third adhesive member 166, but the embodiment is not limited thereto. That is, according to another embodiment, one or more adhesive members may also include some of the first adhesive member 162, the second adhesive member 164, and the third adhesive member 166.

In addition, according to the embodiment, one or more components 110 to 190 of the camera module 100 illustrated in FIG. 2 may be omitted. Alternatively, one or more components which are different from the components 110 to 190 illustrated in FIG. 2 may be further included in the camera module 100.

For the sake of convenience in the description, the third adhesive member 166, the first cover 170, the second cover 174, and an optical layer 190, which are illustrated in FIG. 2, are omitted in FIG. 3.

In addition, the lens assembly 10 (see FIG. 1) may include at least one among the liquid lens part 140, the holder 120, first lens parts 110 and 110A, and second lens parts 130 and 130A, and at least one among the first adhesive member 162, the second adhesive member 164, and the third adhesive member 166. In addition, the lens assembly may be disposed on the main substrate 150.

In addition, in order to distinguish the first lens parts 110 and 110A and the second lens parts 130 and 130A from the liquid lens part 140 in the lens assembly, the first lens parts 110 and 110A and the second lens parts 130 and 130A may be referred to as "first solid lens parts" and "second solid lens parts," respectively.

The first lens parts 110 and 110A may be disposed at an upper side of the lens assembly and may be a region through which light is incident from the outside of the lens assembly. That is, the first lens parts 110 and 110A may be disposed on the liquid lens part 140 in the holder 120. The first lens parts 110 and 110A may be implemented as one lens or two or more lenses, that is, a plurality of lenses which are aligned with each other along a central axis to constitute an optical system. In this case, the central axis may be an optical axis LX of an optical system formed by the first lens parts 110 and 110A, the liquid lens part 140, and the second lens parts 130 and 130A which are included in the camera module 100 or an axis parallel to the optical axis LX. The optical axis LX may be the same as an optical axis of the image sensor 30.

That is, the first lens parts 110 and 110A, the liquid lens part 140, the second lens parts 130 and 130A, and the image sensor 30 may be aligned with each other and disposed along the optical axis LX in an active align (AA) manner. In this case, the term "AA" may indicate an operation of matching optical axes of the first lens parts 110 and 110A, the second lens parts 130 and 130A, and the liquid lens part 140 and adjusting axes or a relationship between distances of the image sensor 30 and the lens parts 110, 110A, 130, 130A, and 140.

As one embodiment, AA may be performed through an operation of analyzing image data generated by the image sensor 30 by receiving light incident from a specific object through at least one among the first lens parts 110 and 110A, the second lens parts 130 and 130A, and the liquid lens part 140. For example, AA may be performed in the following order.

As an example, after AA (first alignment) of adjusting relative positions of the first lens parts 110 and 110A, the second lens parts 130 and 130A, and the image sensor 30, which are fixedly installed in the holder 120, is completed, AA (second alignment) of adjusting relative positions of the liquid lens part 140 and the image sensor 30 inserted into the holder 120 may be performed. The first alignment may be performed by various changing the positions while a gripper holds the middle base 172, and the second alignment may be performed by variously changing the positions while the gripper holds a spacer 143 of the liquid lens part 140. However, AA may also be performed in an order different from the above-described order.

In addition, the holder 120 may include an upper holder region 120U disposed on the liquid lens part 140 and a lower holder region 120D disposed under the liquid lens part 140. In this case, the first and second adhesive members 162 and 164 may couple the upper holder region 120U and the lower holder region 120D to the liquid lens part 140.

In addition, when the first and second adhesive members 162 and 164 are disposed, the liquid lens part 140 may be stably and fixedly coupled to the holder 120.

In addition, the first lens part 110A may include, for example, two lenses L1 and L2, but this is only exemplary and the number of lenses included in the first lens part 110A may be one or more.

In addition, an exposure lens may be disposed at an upper side of the first lens parts 110 and 110A. In this case, the exposure lens may be an outermost lens among the lenses included in the first lens parts 110 and 110A. That is, since the lens L1 positioned at an uppermost side of the first lens part 110A protrudes upward, the lens L1 may serve as the exposure lens. Since the exposure lens protrudes outward from the holder 120, there is a possibility in which a surface of the exposure lens is damaged. When the surface of the exposure lens is damaged, quality of an image captured by the camera module 100 may be degraded. Accordingly, a cover glass may be disposed above the exposure lens or a coating layer may be formed thereon in order to inhibit and suppress surface damage of the exposure lens. Alternatively, the exposure lens may be formed of a wear-resistant material which is harder than that of the other lens of the lens part in order to inhibit surface damage of the exposure lens.

In addition, outer diameters of the lenses L1 and L2 included in the first lens part 110A may increase toward lower portions of the lenses L1 and L2 (for example, in a −z-axis direction), but the embodiment is not limited thereto.

Light incident through the first lens parts 110 and 110A from the outside of the camera module 100 may pass through the liquid lens part 140 and may be incident on the second lens parts 130 and 130A. The second lens parts 130 and 130A may also be implemented as one lens or two or more lenses, that is, a plurality of lenses which are aligned with each other along a central axis to constitute an optical system. For example, as illustrated in FIG. 3, the second lens part 130A may include three lenses L3, L4, and L5, but this is exemplary and the number of lenses included in the second lens parts 130 and 130A may be two or less or four or more.

In addition, outer diameters of the lenses L3, L4, and L5 included in the second lens part 130A may increase toward lower portions of the lenses L3, L4, and L5 (for example, in the −z-axis direction), but the embodiment is not limited thereto.

In addition, unlike the liquid lens part 140, the first lens parts 110 and 110A and the second lens parts 130 and 130A may be implemented as solid lenses formed of glass or plastic, but the present invention is not limited to specific materials of the first lens parts 110 and 110A and the second lens parts 130 and 130A.

In addition, the liquid lens part 140 may include first to fifth regions A1, A2, A3, A4, and A5. Specifically, the fourth region A4 and the fifth region A5 may be disposed at outermost sides of the camera module 100, and the first region A1, the second region A2, and the third region A3 may be disposed between the fourth region A4 and the fifth region A5. In addition, the third region A3 may be disposed between the first region A1 and the second region A2. In addition, the first region A1 may be disposed between the fourth region A4 and the third region A3, and the second region A2 may be disposed between the third region A3 and the fifth region A5.

In other words, the first region A1 and the second region A2 may be regions disposed inside openings formed in side surfaces of the holder 120. The third region A3 may be a region between the first region A1 and the second region A2.

In addition, the fourth region A4 and the fifth region A5 are regions which protrude from the openings of the holder 120 and are disposed at the outside of the holder 120.

Hereinafter, the first adhesive member 162 and the second adhesive member 164 will be described, and the liquid lens part 140 will be described below.

The first adhesive member 162 may include first and second adhesive portions 162-1 and 162-2, and the second adhesive member 164 may include third and fourth adhesive portions 164-1 and 164-2. Each of the adhesive portions may include an adhesive, an epoxy, and the like.

First, the first adhesive portion 162-1 couples the holder 120 and an upper surface 140TS of the fourth region A4 of the liquid lens part 140, and the third adhesive portion 164-1 couples the holder 120 and an upper surface of the fifth region A5 of the liquid lens part 140. In this case, it is illustrated that the upper surface 140TS of each of the fourth region A4 and the fifth region A5 of the liquid lens part 140 is an upper surface of a first connecting substrate 141, but the embodiment is not limited thereto. For example, when the liquid lens part 140 does not include connecting substrates 141 and 144 or the spacer 143, an upper surface of the liquid lens part 140 may be an upper surface of the liquid lens 142.

In addition, the holder 120 may include an upper holder portion disposed on the liquid lens part 140 (or the liquid lens 142) and a lower holder portion disposed under the liquid lens part 140 (or the liquid lens 142). In addition, the holder 120 may include a sidewall facing a side surface of the liquid lens 142 or the liquid lens part 140. The first adhesive portion 162-1 and the third adhesive portion 164-1 may couple the upper holder region 120U and the liquid lens part 140. Accordingly, since the first adhesive portion 162-1 and the third adhesive portion 164-1 couple the holder 120 and the liquid lens part 140, the liquid lens part 140 may be fixed to the holder 120.

In addition, the second adhesive portion 162-2 may couple the holder 120 and a lower surface 140BS and a side surface of the fourth region A4 of the liquid lens part 140. In this case, it is illustrated that the lower surface 140BS of the liquid lens part 140 is a lower surface of the second connecting substrate 144 and a side surface of the liquid lens part 140 is a side surface of the spacer 143, but the embodiment is not limited thereto. For example, when the liquid lens part 140 does not include the first and second connecting substrates 141 and 144 or the spacer 143, a lower surface or the side surface of the liquid lens part 140 may be a lower surface or the side surface of the liquid lens 142, respectively. Similarly, the fourth adhesive portion 164-2 may couple the holder 120 and the lower surface 140BS and side surface 140SS of the fifth region A5 of the liquid lens part 140. In this case, the lower surface 140BS of the liquid lens part 140 may be the lower surface of the second connecting substrate 144, and the side surface 140SS of the liquid lens part 140 may be the side surface of the spacer 143, but the embodiment is not limited thereto. For example, when the liquid lens part 140 does not include the connecting substrates 141 and 144 or the spacer 143, the lower surface or side surface of the liquid lens part 140 may be the lower surface or side surface of the liquid lens 142, respectively.

In addition, the second adhesive portion 162-2 and the fourth adhesive portion 164-2 may couple the lower holder region 120D and the liquid lens part 140. Accordingly, the second adhesive portion 162-2 and the fourth adhesive portion 164-4 couple the holder 120 and the liquid lens part 140 to seal the openings of the holder 120. For example, the first adhesive portion 162-1 and the second adhesive portion 164-1 may be connected to each other, and the third adhesive portion 164-1 and the fourth adhesive portion 164-2 may be connected to each other so that the above-described sealing may be performed.

Although not illustrated, the third adhesive member 166 may be disposed to fill a separation space (or gap) between an upper surface of the holder 120 and the first cover 170. In addition, the third adhesive member 166 may be omitted as necessary. In this case, the separation space between the upper surface of the holder 120 and the first cover 170 may be empty.

The embodiment is not limited to shapes of the first to third adhesive members 162, 164, and 166 described above. That is, as long as an inner portion of the holder 120 may be sealed to inhibit foreign matter from being introduced into the holder 120 through the openings of the holder 120, the first to third adhesive members 162, 164, and 166 may have various shapes. For example, in a state in which the first adhesive member 162 and the second adhesive member 164 are disposed to seal the openings of the holder 120, when the third adhesive member 166 is disposed to fill the separation space between the upper surface of the holder 120 and the first cover 170, the third region A3 of the liquid lens part 140 disposed in an inner space of the holder 120 may be sealed from the outside. Accordingly, reliability against foreign matter of the camera module 100 according to the embodiment can be improved, degradation of optical performance can be inhibited, and a defect rate thereof can be reduced.

In addition, the first to fourth adhesive portions 162-1, 164-1, 162-2, and 164-2 may have various shapes. That is, the first adhesive portion 162-1, the second adhesive portion 162-2, the third adhesive portion 164-1, and the fourth adhesive portion 164-2 may have shapes corresponding to shapes of the openings of the holder 120.

In addition, an adhesive may be disposed in the first and second regions A1 and A2 in addition to the fourth region A4 and the fifth region A5 but is not limited thereto.

In addition, the first cover 170 may be disposed to surround the holder 120, the liquid lens part 140, the middle base 172, and a sensor base 178. Accordingly, the first cover 170 may be in contact with an upper surface 120S of a shoulder side of the holder 120. In this case, when levels of upper surfaces 162S of the first adhesive portion 162-1 and the third adhesive portion 164-1 are higher than a level of the upper surface 120S of the shoulder side of the holder 120, the first cover 170 may be in contact with the upper surfaces 162S of the first adhesive portion 162-1 and the third adhesive portion 164-1 instead of the upper surface 120S of the holder 120 at the shoulder side. Accordingly, the first cover 170 may be unstably fixed to the holder 120. In order to inhibit this, the upper surface 120S of the holder 120 may be disposed at the level different from the level of the upper surface 162S of the first adhesive portion 162-1 by a predetermined level. Similarly, the level of the upper surface 120S of the holder 120 may be higher than a level of an upper surface 164S of the third adhesive portion 164-1 by a predetermined level.

In addition, the upper surface 120S of the holder 120 may be collinearly with the upper surface 162S of the first adhesive portion 162-1, and upper surface 120S of the holder 120 may be collinearly with the upper surface 164S of the third adhesive portion 164-1.

In addition, the liquid lens part 140 mentioned in description of features of the first adhesive member 162 and the second adhesive member 164 was described as including the first and second connecting substrates 141 and 144. However, the liquid lens part 140 mentioned in description of the features of the first adhesive member 162 and the second adhesive member 164 need not include the first and second connecting substrates 141 and 144.

In addition, the first cover 170 may be disposed to surround the holder 120, the liquid lens part 140, the third adhesive member 166, and the middle base 172 to protect the holder 120, the liquid lens part 140, the third adhesive member 166, and the middle base 172 from an external impact. Particularly, the first cover 170 may be disposed to protect a plurality of lenses constituting an optical system from an external impact.

In addition, the first cover 170 may include an upper opening 170H formed in an upper surface thereof. Accordingly, the first lens parts 110 and 110A disposed in the holder 120 may be exposed to external light.

In addition, the middle base 172 may be disposed to surround a hole of the holder 120. Accordingly, the middle base 172 may include an accommodation hole 172H for accommodating the hole of the holder 120. An inner diameter of the middle base 172 (that is, a diameter of the accommodation hole 172H) may be greater than or equal to an outer diameter of the hole of the holder 120. In addition, it is illustrated that the accommodation hole 172H of the middle base 172 and the hole of the holder 120 are circular shapes, but the embodiment is not limited thereto, and the shapes of the accommodation hole 172H of the middle base 172 and the hole of the holder 120 may be variously changed. In addition, the middle base 172 may be mounted on the main substrate 150 to be spaced apart from circuit elements 151.

Like the upper opening 170H of the first cover 170, the accommodation hole 172H may be disposed at a position corresponding to a position of the image sensor 30 disposed in the camera module 100 near a central portion of the middle base 172.

In addition, the camera module 100 may further include the sensor base 178 and a filter 176 and may also further include a circuit cover 154.

The filter 176 may filter light passing through the first lens parts 110 and 110A, the liquid lens part 140, and the second lens parts 130 and 130A based on a specific wavelength band. The filter 176 may be an infrared (IR) light cut-off filter or ultraviolet (UV) light cut-off filter, but the embodiment is not limited thereto.

In addition, the filter 176 may be disposed on the image sensor 30. The filter 176 may be disposed in the sensor base 178. For example, the filter 176 may be disposed on an inner groove or stepped portion of the sensor base 178.

The sensor base 178 may be disposed under the middle base 172 and attached to the main substrate 150. The sensor base 178 may surround the image sensor 30 to protect the image sensor 30 from external foreign matter or an external impact.

Next, the main substrate 150 may be disposed under the middle base 172 and may include a groove, in which the image sensor 30 may be installed, seated, in contact with, fixed, temporarily fixed, supported, or accommodated, the circuit elements 151, a connecting part (or flexible printed circuit board (FPCB)) 152, and a connector 153.

Specifically, the main substrate 150 may include a holder region in which the holder 120 is disposed and an element region in which the plurality of circuit elements 151 are disposed.

The main substrate 150 may be implemented as a rigid flexible printed circuit board (RFPCB) including the FPCB 152. The FPCB 152 may be bent according to requirements for a space in which the camera module 100 is installed.

In addition, the circuit elements 151 of the main substrate 150 may constitute a control module configured to control the liquid lens part 140 and the image sensor 30. Here, the control module will be described below.

In addition, the circuit elements 151 may include one or more of passive elements and active elements and may have one of various areas and one of various heights. The plurality of circuit elements 151 may be provided, a height of the plurality of circuit elements 151 may be higher than a height of the main substrate 150, and the plurality of circuit elements 151 may protrude outward. The plurality of circuit elements 151 may be disposed to not overlap the holder 120 in a direction parallel to the optical axis LX. For example, the plurality of circuit elements 151 may include a power inductor, a gyro sensor, and the like, but the embodiment is not limited to a specific type of circuit elements 151.

The circuit cover 154 may be disposed to cover the circuit elements 151. Accordingly, the circuit cover 154 may protect the circuit elements 151 disposed on the main substrate 150 from an external impact. In addition, to this end, the circuit cover 154 may include an accommodation space for accommodating and covering the circuit elements 151 disposed on the main substrate 150 in consideration of shapes and positions of the circuit elements 151. In addition, the circuit cover 154 may serve an electromagnetic blocking function.

The image sensor 30 may serve a function of converting light passing through the first lens parts 110 and 110A, the liquid lens part 140, and the second lens parts 130 and 130A of the lens assembly 110, 120, 130, 140, 162, and 164 into image data. More specifically, the image sensor 30 may convert light into an analog signal through a pixel array including a plurality of pixels and synthesize a digital signal corresponding to the analog signal to generate image data.

Referring to FIGS. 3 and 4, the liquid lens part 140 may include a first connecting substrate (or individual electrode connecting substrate) 141, the liquid lens (or liquid lens body) 142, the spacer 143, and the second connecting substrate (or common electrode connecting substrate) 144.

The first connecting substrate 141 may electrically connect a plurality of first electrodes (not shown) included in the liquid lens 142 to the main substrate 150 and may be disposed on the liquid lens 142. The first connecting substrate 141 may be implemented as an FPCB.

In addition, the first connecting substrate 141 may be electrically connected to electrode pads 150-1 formed on the main substrate 150 through connecting pads 141-1 electrically connected to the plurality of first electrodes. To this end, after the liquid lens part 140 is inserted into the inner space of the holder 120, and after the first connecting substrate 141 is bent toward the main substrate 150 in the −z-axis direction, the connecting pads 141-1 and the electrode pads 150-1 may be electrically connected by a conductive epoxy. As another embodiment, the first connecting substrate 141 may be connected to conductive first holder surface electrodes disposed, formed, or applied on a surface of the holder 120 and may be electrically connected to the main substrate 150 through the conductive first holder surface electrodes disposed on the holder 120, but the embodiment is not limited thereto.

The second connecting substrate 144 may electrically connect second electrodes (not shown) included in the liquid lens 142 to the main substrate 150 and may be disposed under the liquid lens 142. The second connecting substrate 144 may be implemented as an FPCB or single metal substrate (conductive metal plate).

In addition, the second connecting substrate 144 may be electrically connected to the electrode pads formed on the main substrate 150 through connecting pads electrically connected to the second electrodes. To this end, after the liquid lens part 140 is inserted into the inner space of the holder 120, the second connecting substrate 144 may be bent toward the main substrate 150 in the −z-axis direction. As another embodiment, the second connecting substrate 144 may be connected to conductive surface electrodes disposed, formed, or applied on the surface of the holder 120 and electrically connected to the main substrate 150 through the conductive surface electrodes disposed on the surface of the holder 120, but the embodiment is not limited thereto.

The liquid lens 142 may include a cavity CA. In addition, in the cavity CA, an area of an opening in a direction in which light is incident may be smaller than an area of an opening in the opposite direction. Alternatively, the liquid lens 142 may be disposed so that an inclination direction of the cavity CA is opposite. That is, the area of the opening of the cavity CA in the direction in which the light is incident may also be greater than the area of the opening in the opposite direction. In addition, when the liquid lens 142 is disposed so that the inclination direction of the cavity CA is opposite, due to the inclination direction of the liquid lens 142, all or a part of a layout of components included in the liquid lens 142 may be changed, or only the inclination direction of the cavity CA may be changed and the layout of the other components may not be changed.

The spacer 143 may be disposed to surround the liquid lens 142 to protect the liquid lens 142 from an external impact. To this end, the spacer 143 may have a shape in which the liquid lens 142 may be installed, seated, in contact with, fixed, temporarily fixed, supported, coupled, and disposed.

For example, the spacer 143 may include a hollow 143H in which the liquid lens 142 is accommodated and a frame surrounding the hollow 143H formed at a central portion. Accordingly, the spacer 143 may have a quadrangular flat shape of which a central portion is open (hereinafter, a "□" shape), but the embodiment is not limited thereto.

In addition, the spacer 143 may be disposed between the first connecting substrate 141 and the second connecting substrate 144 and disposed to protrude from the openings of the holder 120.

In addition, the liquid lens 142 may include a plurality of liquids LQ1 and LQ2 having different types, first to third plates 147, 145, and 146, first and second electrodes E1 and E2, and an insulating layer 148. The liquid lens 142 may further include an optical layer 190.

In addition, the plurality of liquids LQ1 and LQ2 are accommodated in the cavity CA and may include a first liquid LQ1 which is conductive and a second liquid (or insulating liquid) LQ2 which is non-conductive. In addition, the first liquid LQ1 and the second liquid LQ2 are not mixed with each other, and an interface BO may be formed at a portion which is disposed between the first and second liquids LQ1 and LQ2 and at which the first and second liquids LQ1 and LQ2 are in contact with each other. In addition, the second liquid LQ2 may be disposed on the first liquid LQ1, but the embodiment is not limited thereto.

In addition, in a cross-sectional shape of the liquid lens 142, thicknesses of edges of the first and second liquids LQ2 and LQ1 may be smaller than thicknesses of central portions of the first and second liquids LQ2 and LQ1. However, the present invention is not limited thereto. An inner surface of the first plate 147 may constitute a sidewall i of the cavity CA. The first plate 147 may include a vertical open part having a predetermined inclined surface. That is, the cavity CA may be a region surrounded by the inclined surface of the first plate 147, the second plate 145, and the third plate 146.

In addition, according to the embodiment, a size (or an area or width) 01 of an upper opening may be greater than a size (or an area or width) O2 of a lower opening. In this case, a size of each of the upper opening and the lower opening may be a cross-sectional area in a horizontal direction (for example, an x-axis direction or a y-axis direction). For example, the size of the opening may be a radius when a cross section of the opening has a circular shape and may be a length of a diagonal line when the cross section of the opening has a square shape. In addition, the diameter of the opening may vary according to a field of view (FOV) required for the liquid lens 142 or a role that the liquid lens 142 serves in the camera module 100.

In addition, each of the openings may have a hole shape having a circular cross section. The interface BO may move along an inclined surface of the cavity CA according to a driving voltage.

In addition, the first liquid LQ1 and the second liquid LQ2 may fill, be accommodated in, or be disposed in the cavity CA. In addition, the cavity CA is a portion through which light passing through the first lens parts 110 and 110A passes. In addition, since the first plate 147 is positioned outside the cavity CA, the first plate 147 may be formed of a transparent material. In addition, the first plate 147 may also include impurities in order to not allow light to pass therethrough easily.

In addition, electrodes may be disposed on one surface of the first plate 147 and the other surface thereof. The plurality of first electrodes E1 may be disposed to be spaced apart from the second electrode E2 and may be disposed on one surface (for example, an upper surface, a side surface, or a lower surface) of the first plate 147. The second electrode E2 may be disposed in at least a partial region of the other surface (for example, the lower surface) of the first plate 147 and may be in direct contact with the first liquid LQ1.

In addition, the first electrodes E1 may include n electrodes (hereinafter, individual electrodes), and the second electrode E2 may include one electrode (hereinafter, a common electrode). In this case, n is an integer greater than or equal to two. In this case, a case in which there are four first electrodes E1 and the second electrode E2 will be described. That is, two ends electrically connected to the liquid lens 142 may be any one of the plurality of first electrodes E1 and the second electrode E2.

In addition, a part of the second electrode E2 (that is an electrode sector of the second electrode E2) disposed on the other surface of the first plate 147 may be exposed to the conductive first liquid LQ1.

The first and second electrodes E1 and E2 may be formed of conductive materials. For example, the first electrodes E1 and the second electrode E2 may be formed of a metal.

In addition, the second plate 145 may be disposed on one surface of the first electrode E1. That is, the second plate 145 may be disposed on the first plate 147. Specifically, the second plate 145 may be disposed on an upper surface of the first electrode E1 and the cavity CA.

The third plate 146 may be disposed on one surface of the second electrode E2. That is, the third plate 146 may be disposed under the first plate 147. Specifically, the third plate 146 may be disposed under a lower surface of the second electrode E2 and the cavity CA.

The second plate 145 and the third plate 146 may be disposed with the first plate 147 interposed therebetween in opposite directions. In addition, at least one of the second plate 145 and the third plate 146 may also be omitted.

At least one of the second and third plates 145 and 146 may have a quadrangular flat shape. The third plate 146 may be in contact with and adhered to the first plate 147 at a bonding region around an edge of the third plate 146.

The second plate 145 and the third plate 146 are regions through which light passes and may be formed of transparent materials. For example, the second and third plates 145 and 146 may be formed of glass and may be formed of the same material for the sake of convenience in the process. In addition, edges of the second and third plates 145 and 146 may have quadrangular shapes but are not necessarily limited thereto.

In addition, the second plate 145 may allow light incident through the first lens parts 110 and 110A to travel into the cavity CA of the first plate 147.

In addition, the third plate 146 may allow light passing through the cavity CA of the first plate 147 to travel toward the second lens parts 130 and 130A. The third plate 146 may be in direct contact with the first liquid LQ1.

According to the embodiment, the third plate 146 may have a diameter greater than a diameter of a larger opening among the upper opening and the lower opening of the first plate 147. In addition, the third plate 146 may include a nearby region spaced apart from the first plate 147.

For example, a real effective lens region of the liquid lens 142 may be smaller than a diameter (for example, a size) O2 of the larger opening among the upper opening and lower opening of the first plate 147. That is, when a radius of a smaller range than a central portion of the liquid lens 142 is used as a path through which light is transmitted, a diameter O3 of a central region of the third plate 146 may be smaller than a diameter (for example, a size) O2 of a larger opening among third and fourth openings of the first plate 147.

The insulating layer 148 may be disposed to cover a part of a lower surface of the second plate 145 in an upper region of the cavity CA. That is, the insulating layer 148 may be disposed between the second liquid LQ2 and the second plate 145.

In addition, the insulating layer 148 may be disposed to cover a part of the first electrode E1 constituting the sidewall of the cavity CA. In addition, the insulating layer 148 may be disposed to cover a part of the first electrode E1, the first plate 147, and the second electrode E2 on the lower surface of the first plate 147. Accordingly, contact between the first electrode E1 and the first liquid LQ1 and contact between the first electrode E1 and the second liquid LQ2 may be blocked by the insulating layer 148.

The insulating layer 148 may cover one electrode (for example, the first electrode E1) among the first electrode E1 and the second electrode E2 and expose a part of another electrode (for example, the second electrode E2) to allow electric energy to be supplied to the conductive first liquid LQ1.

Meanwhile, the optical layer 190 may be disposed on one surface of at least one of the second plate 145 and the third plate 146. For example, the optical layer 190 may be disposed at at least one side of upper and lower sides of the second plate 145, may be disposed at at least one side of upper and lower sides of the third plate 146, and may also be disposed at at least one side of upper and lower sides of each of the second and third plates 145 and 146.

In addition, although the liquid lens 142 and the optical layer 190 are individually illustrated, the optical layer 190 may also be a component of the liquid lens 142. In addition, while it is illustrated that the optical layer 190 is a single layer, this is only to illustrate presence of the optical layer 190. That is, the optical layer 190 may be a single layer or multiple layers. The optical layer 190 may also be omitted.

In addition, the optical layer 190 may include at least one of a UV cut-off layer, an anti-reflection layer, and an IR cut-off layer. The optical layer 190 may be disposed to overlap the image sensor 30 in a direction of the optical axis LX (that is, a z-axis direction) or a direction parallel to the optical axis direction. In addition, the optical layer 190 may be disposed in the third region A3 of the liquid lens part 140. For example, the UV cut-off layer may block light in a UV region, particularly a UV-A region. The anti-reflection layer may serve to inhibit light from being reflected by the second plate 145 or the third plate 146, serve to reduce reduction of light transmittance due to Fresnel loss in the liquid lens 142, and also serve to inhibit degradation of night visibility of the liquid lens 142. Particularly, although not illustrated, the anti-reflection layer may be disposed on an inclined surface and a lower surface of the insulating layer 148 and may inhibit quality of light reflected and transmitted to the image sensor 30 from being degraded.

In addition, an IR cut-off layer may block light in an IR region. The IR cut-off layer may inhibit IR light from being incident on the liquid lens 142 from the outside to remove heat mura of an image and reduce light reflection by a surface of the liquid lens 142 to inhibit reduction of night visibility.

In addition, at least one of the UV cut-off layer, the anti-reflection layer, and the IR cut-off layer may be disposed at at least one of a light input part and a light output part of the camera module 100 according to the embodiment.

In addition, the optical layer 190 according to the embodiment may have a coated form or film form. For example, the anti-reflection layer of the optical layer 190 may be formed by coating in a spray manner at a low-temperature.

FIGS. 5A to 5E are views for describing a driving method of the liquid lens part. Hereinafter, a case in which a voltage is applied between the first electrode and the second electrode will be described.

Figure 5A:
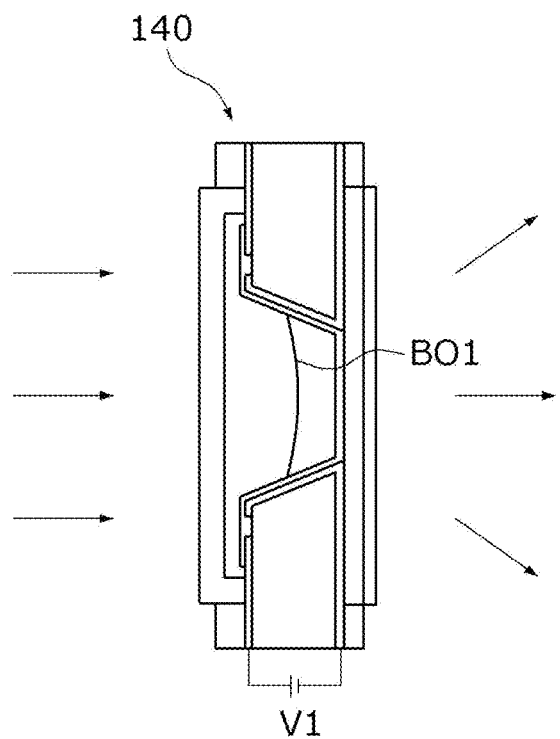
FIGS. 5A to 5E are views for describing a driving method of the liquid lens part.
Figure 5B:
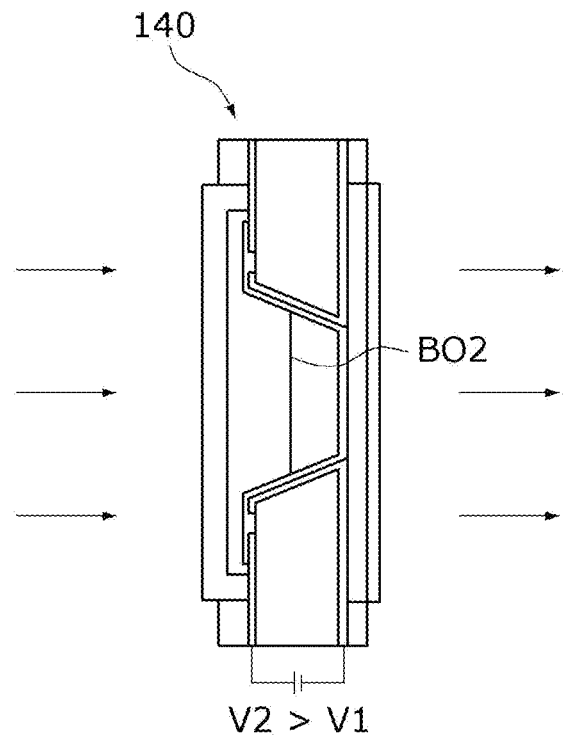

First, in FIG. 5A, a first voltage V1 is applied to the liquid lens part 140 so that an interface BO1 of the liquid lens may be convex in a light propagation direction. Accordingly, it is illustrated that the liquid lens part operates as a concave lens. In addition, in FIG. 5B, a second voltage V2 greater than the first voltage V1 is applied to the liquid lens part 140 so that an interface BO2 of the liquid lens may be perpendicular to the light propagation direction. Accordingly, it is illustrated that the liquid lens part does not change the light propagation direction. In addition, in FIG. 5C, a third voltage V3 greater than the second voltage V2 is applied to the liquid lens part 140 so that an interface BO3 of the liquid lens may be convex in a direction opposite to the light propagation direction. Accordingly, it is illustrated that the liquid lens part operates as a convex lens. In this case, when the first voltage V1 to third voltage V3 are applied thereto, the interfaces BO1, BO2, and BO3 of the liquid lens in the liquid lens part 140 may have curvatures different from each other.

That is, in the liquid lens part 140 according to the embodiment, it is illustrated that a curvature or diopter of the liquid lens of the liquid lens part is changed according to a level of the applied voltage, but the present invention is not limited thereto, and the curvature or diopter of the liquid lens may also be changed according to a pulse width of an applied pulse.

Figure 5C:
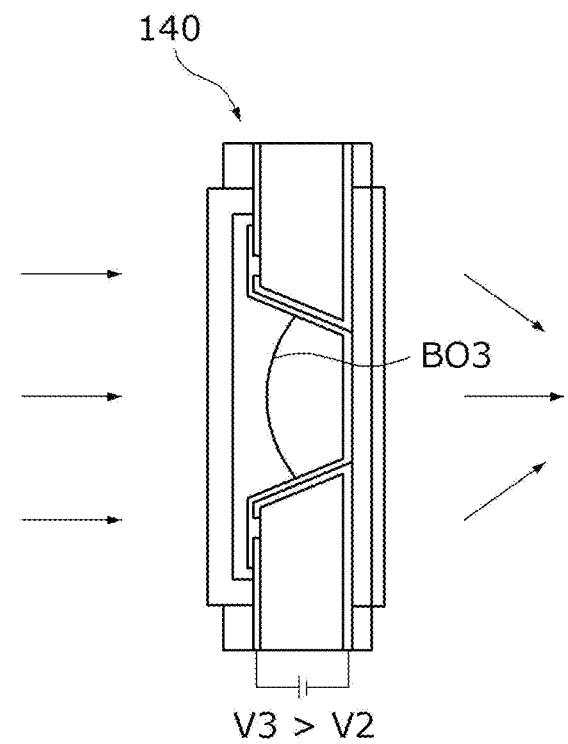
Figure 5D:
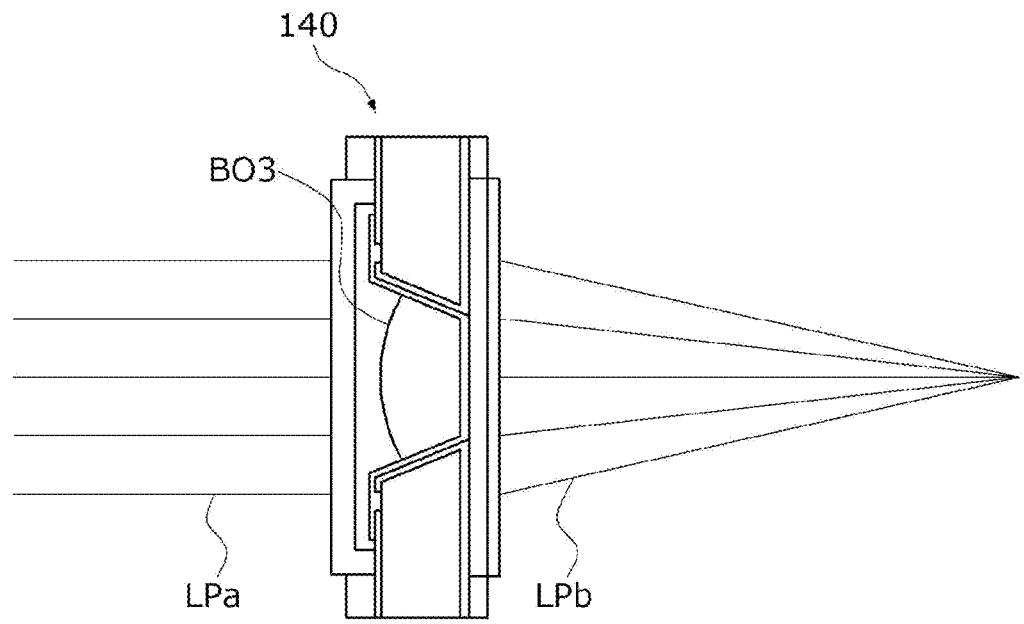

In addition, in FIG. 5D, it is illustrated that the liquid lens in the liquid lens part 140 has the interface BO3 which is the same as in FIG. 5C so that the liquid lens operates as the convex lens. Accordingly, in FIG. 5D, incident light LPa is concentrated so that corresponding output light LPb is output.

Figure 5E:
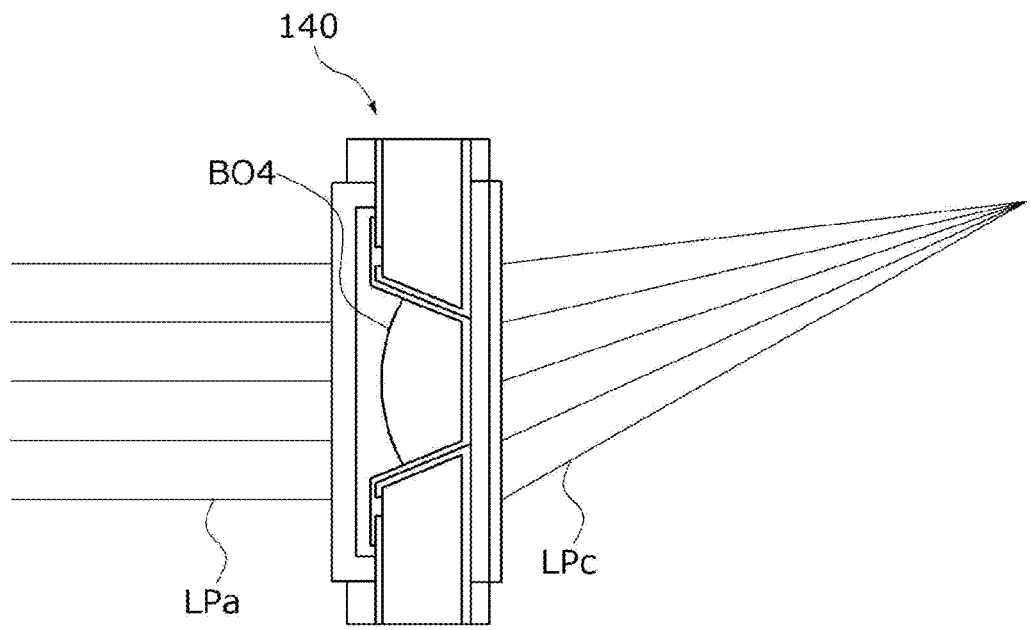

In addition, in FIG. 5E, it is illustrated that, since the liquid lens in the liquid lens part 140 has an asymmetric curved surface (for example, an interface is convex at an upper portion thereof in the direction opposite to the light propagation direction), the light propagation direction is changed toward one side (for example, an upper side). That is, according to FIG. 5D, the incident light LPa is concentrated on the upper side so that corresponding output light LPc is output.

Figure 6:
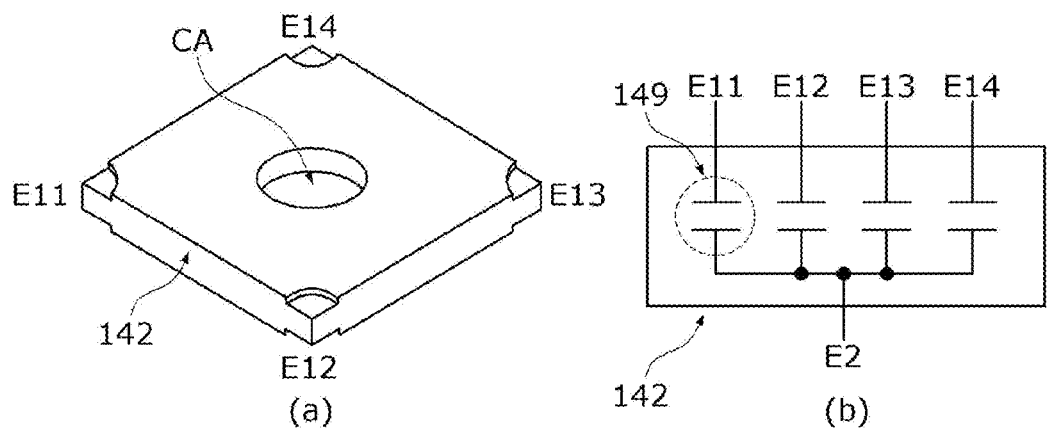
FIG. 6 is a set of views for describing the liquid lens part of which an interface is adjusted to correspond to a driving voltage.

FIG. 6 is a set of views for describing the liquid lens part of which an interface is adjusted to correspond to a driving voltage.

Referring to FIG. 6, the liquid lens part will be described with reference to FIG. 6A, and an equivalent circuit of the liquid lens part will be described with reference to FIG. 6B.

Referring to FIG. 6A, a lens of which a focal distance is adjusted to correspond to a driving voltage may receive a voltage through individual terminals L1, L2, L3, and L4 which have the same angular distance and are disposed in four directions different from each other. The individual terminals may be disposed at the same angular distance from a central axis of the liquid lens and four individual terminals. Four individual terminals may be disposed at four corners of the liquid lens. When the voltage is applied through the individual terminals L1, L2, L3, and L4, a shape of an interface of the liquid lens is changed due to a driving voltage generated due to an interaction between the applied voltage and a voltage applied through a common terminal C0.

In addition, referring to FIG. 6B, one side of the liquid lens 142 may receive an operating voltage through the different individual terminals L1, L2, L3, and L4, and another side may be electrically connected to the common terminal C0. In addition, the common terminal C0 and a plurality of capacitors 149 may be connected. In addition, the plurality of capacitors 149 included in the equivalent circuit may have a low capacitance of about several tens to 200 pF or less. The terminals of the liquid lens may also be referred to as electrode sectors or sub-electrodes.

Figure 7A:
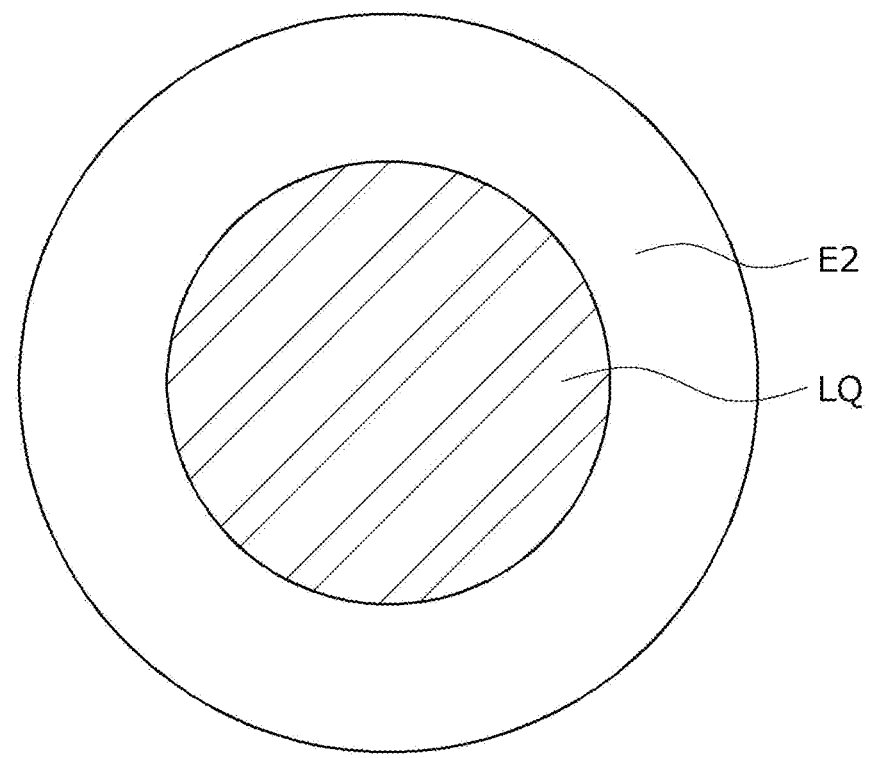
FIGS. 7A and 7B are views illustrating a structure of the liquid lens part.
Figure 7B:
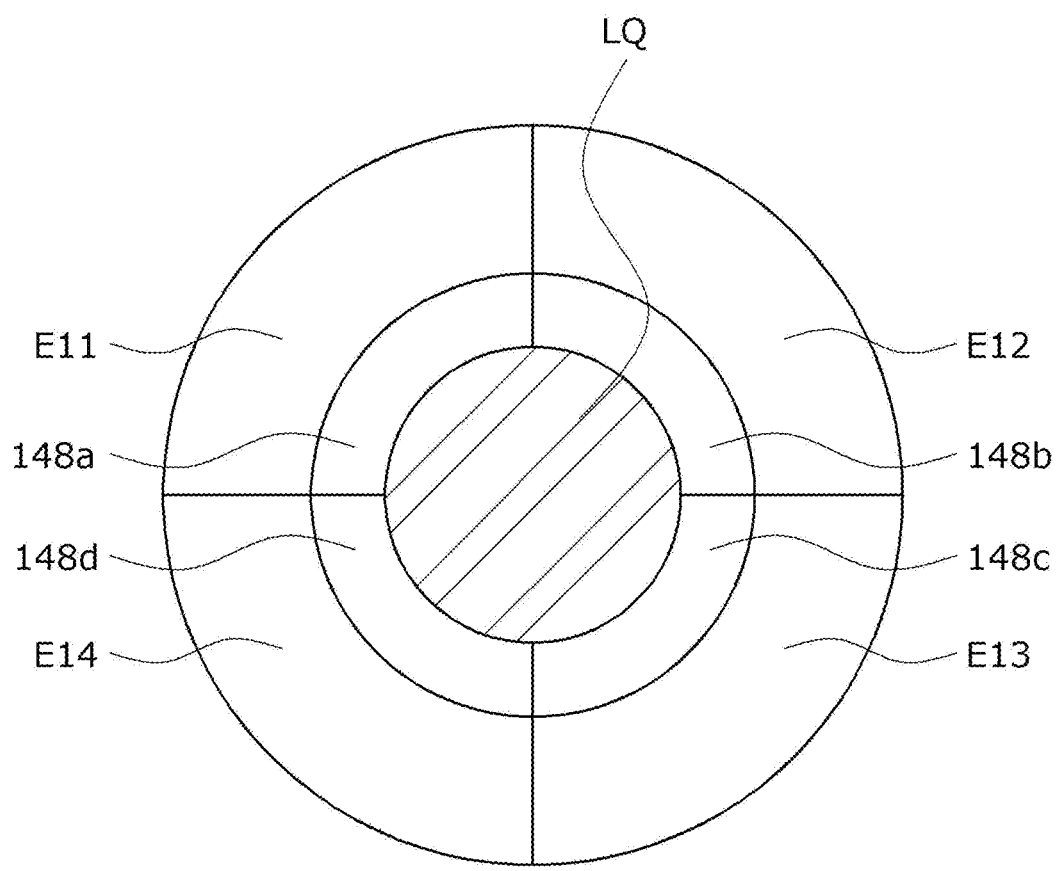

FIGS. 7A and 7B are views illustrating a structure of the liquid lens part.

Referring to FIG. 7A, a common electrode E2 (corresponding to the second electrode) may be disposed at one side of the liquid lens part 140. In this case, the common electrode E2 may be disposed in a tube form, and a liquid LQ may be disposed in a lower region of the common electrode E2, particularly, in a region corresponding to a hollow.

Meanwhile, although not illustrated in the drawings, an insulating layer may be disposed between the common electrode E2 and the liquid in order to insulate the common electrode E2.

In addition, as in FIG. 7B, a plurality of first electrodes E11 to E14 may be disposed under the common electrode, particularly, under the liquid LQ. Particularly, the plurality of first electrodes E11 to E14 may be formed in a shape surrounding the liquid LQ.

In addition, a plurality of insulating layers 148a to 148d for insulation may be disposed between the plurality of first electrodes E11 to E14 and the liquid LQ, respectively.

Figure 8:
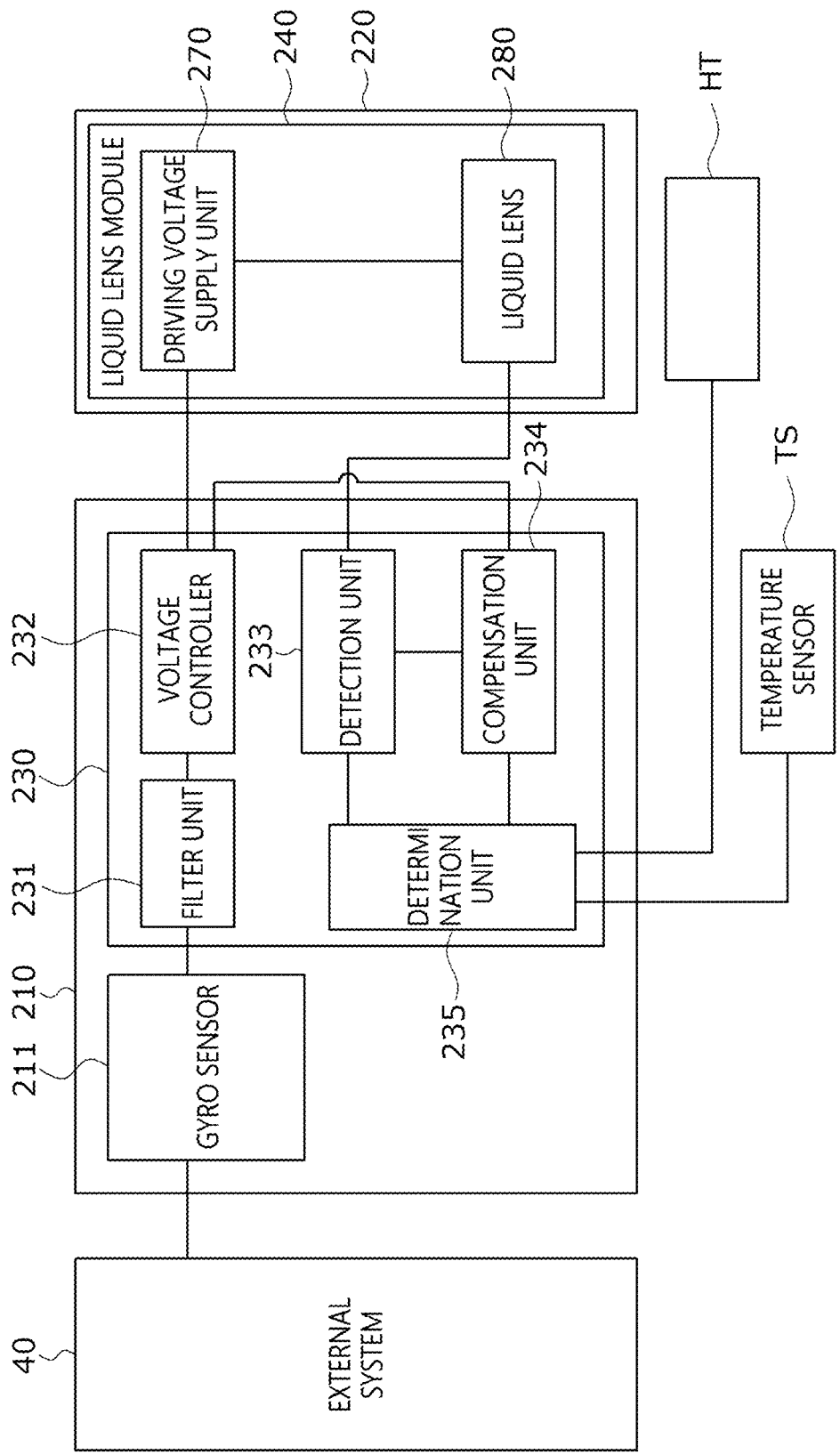
FIG. 8 is a block diagram illustrating a camera module according to the embodiment.

FIG. 8 is a block diagram illustrating a camera module according to the embodiment.

Referring to FIG. 8, a camera module 200 may include a control circuit 210 and a lens assembly 220. The control circuit 210 corresponds to the control circuit 20, and the lens assembly 220 is the lens assembly 10, that is, corresponds to the lens assembly 110, 120, 130, 140, 162, and 164.

In addition, the control circuit 210 may include a gyro sensor 211 and a control unit 230 and control operation of a liquid lens module 240 including a liquid lens 280.

In addition, the control unit 230 may include components for performing an AF function and an OIS function and control the liquid lens 280 included in the lens assembly 220 using a requirement of a user or detecting result (for example, a detecting signal of the gyro sensor 211). In this case, the liquid lens 280 may correspond to the liquid lens 142 described above.

The gyro sensor 211 may detect an angular speed and may be positioned in the control unit 230. However, the present is not limited to the position.

Specifically, the control unit 230 may include a voltage controller 232, a sensing unit 233, and a compensation unit 234. As described above, the gyro sensor 211 may be an independent component which is not included in the control unit 230 and may be included in the control unit 230.

The gyro sensor 211 may detect angular speeds in two directions of, for example, a yaw axis and a pitch axis for compensating for vertical and horizontal hand shaking of an optical device. The gyro sensor 211 may generate a motion signal having information of the detected angular speeds and provide the information to the voltage controller 232.

A filter part 231 may filter a signal received from the gyro sensor 211. That is, the filter part 231 may remove a noise component and extract a component in only a desired band. For example, the filter part 231 may remove a noise component with a high frequency in the motion signal and extract a component in a desired band using a low pass filter (LPF) in order to realize an OIS function.

In addition, the voltage controller 232 may calculate a driving voltage corresponding to a shape that the liquid lens 280 of the liquid lens module 240 should have.

Specifically, the voltage controller 232 may receive information (that is, information of a distance to an object) for an AF function from an internal component (for example, the image sensor 30) or external component (for example, a distance sensor or application processor) of an optical device or the camera module 200 and may use the distance information to calculate a driving voltage corresponding to a shape that the liquid lens 280 should have according to a focal distance for focusing on an object.

In addition, the voltage controller 232 may obtain a driving voltage code corresponding to the calculated driving voltage with reference to a driving voltage table and output the obtained driving voltage code to the lens assembly 220 (for example, a driving voltage providing unit 270). In this case, the voltage controller 232 may have the driving voltage table in which driving voltage codes are mapped to generate driving voltages. However, the present invention is not limited to such a position. It is illustrated that the driving voltage providing unit 270 is disposed in the liquid lens module, but the driving voltage providing unit 270 may be included in the control circuit 210.

Alternatively, the voltage controller 232 may generate an analog driving voltage corresponding to a driving voltage code based on a digital driving voltage code and provide the analog driving voltages to the lens assembly 220 or the driving voltage providing unit 270.

As an example, the voltage controller 232 may output a driving voltage corresponding to a shape of an interface of the liquid lens 280 according to information, which is a data type (for example, digital) voltage code, corresponding to the interface of the liquid lens and feedback information. A first driving signal and a second driving signal, which will be described below, may correspond to the voltage codes.

In addition, the voltage controller 232 may further include a voltage booster which receives a supply voltage (for example, a voltage supplied from a separate power circuit) and increases a voltage level, a voltage stabilizer configured to stabilize an output of the voltage booster, and a switching unit configured to selectively supply an output of the voltage booster to terminals of the liquid lens 280.

In this case, the switching unit may include a component of a circuit called an H Bridge. A high-voltage output from the voltage booster may be applied as a power voltage of the switching unit. In addition, the switching unit may selectively supply the applied power voltage and a ground voltage to two ends of the liquid lens 280.

In addition, the liquid lens 280 includes four first electrodes including four electrode sectors for driving the liquid lens 280, a first connecting substrate, one second electrode, and a second connecting substrate as described above. In addition, two ends of the liquid lens 280 may be any one of the plurality of first electrodes and the second electrode. In addition, two ends of the liquid lens 280 may be any one of four electrode sectors of the four first electrodes and one electrode sector of the second electrode.

Accordingly, a voltage having a pulse type with a predetermined width may be applied to each of the electrode sectors of the liquid lens 280. In addition, a driving voltage may be a difference between a voltage applied to the first electrode and a voltage the second electrode and may be applied to the liquid lens 280.

In the embodiment, in order for the voltage controller 232 to control a driving voltage applied to the liquid lens 280 according to a digital driving voltage code, the voltage booster may control an increasing voltage level, and the switching unit may control phases of pulse voltages applied to the common electrode and the individual electrode to generate an analog driving voltage corresponding to a driving voltage code. That is, the control unit 230 may control a voltage applied to each of the first electrode and the second electrode.

In addition, the control circuit 210 may further include a connector (not shown) which performs a communication or interface function of the control circuit 210. For example, the connector may convert a communication protocol for communication between the control circuit 210 using an inter-integrated circuit (I2C) communication method and the lens assembly 220 using a mobile industry processor interface (MIPI) communication method. In addition, power needed for operation of the control unit 230 and the lens assembly 220 may be supplied through the connector from an external device (for example, a battery). In this case, the connector may correspond to the connector 153 illustrated in FIG. 2.

Next, the sensing unit 233 may detect information corresponding to an interface of the liquid lens. In this case, the information corresponding to the interface of the liquid lens may be a driving voltage code as described above, and the information may be obtained from a capacitor 149 (see FIG. 6). In the embodiment, the sensing unit 233 may detect a voltage value through a value of the capacitor in the liquid lens 280 and digitally convert the value to detect the above-described driving voltage code. In addition, the information corresponding to the interface of the liquid lens may correspond to a voltage applied to each of a plurality of individual terminals of the liquid lens 280 or an average voltage thereof.

However, the information corresponding to the interface of the liquid lens may be the same as a driving signal (for example, a digital signal) which is received from an external system 40, which will be described below, and adjusts the interface of the liquid lens 280. That is, in the present embodiment, the information corresponding to the interface of the liquid lens is a driving code corresponding to a driving voltage provided to the driving voltage providing unit 270 or the liquid lens 280 (for bypass) from a control unit in a mobile terminal or the external system 40 including a controller when a shape of the interface of the liquid lens 280 is changed to have a desired diopter regardless of a temperature. Accordingly, even when the interface of the liquid lens 280 is changed according to the information corresponding to the interface of the liquid lens, the diopter may not be a desired diopter in consideration of deformation of the liquid interface according to a temperature.

Accordingly, the compensation unit 234 may compensate the information corresponding to the interface of the liquid lens with the temperature information and feedback to readjust the interface of the liquid lens 280. For example, the compensation unit 234 may provide feedback information which is a compensated signal to the voltage controller 232. Accordingly, the liquid lens 280 may provide a diopter desired by the external system 40 even when a temperature changes.

A temperature sensor TS may detect temperature information (Celsius or the like) of the liquid lens 280 in relation to operation of the compensation unit 234. The temperature sensor TS may include various elements such as a thermistor. The temperature sensor TS may be positioned inside the liquid lens module 240, inside the control unit 230, or outside the camera module. In addition, the temperature sensor TS may detect a temperature of the liquid lens 280, a temperature of the liquid lens module 240, or a temperature of the camera module. However, in the embodiment, a case in which the temperature of the liquid lens 280 is detected will be described below.

In addition, in the embodiment, the compensation unit 234 may include a first input part, a second input part, a data part, a first calculating unit, and a second calculating unit.

First, the first input part may receive the above-described information corresponding to the interface of the liquid lens. In the embodiment, the first input part may receive the information corresponding to the interface of the liquid lens from the sensing unit 233. That is, the first input part may receive the information corresponding to the interface of the liquid lens which is detected by the sensing unit 233 and is a driving code for a desired diopter. In other words, the first input part may receive initial diopter information applied from the external system 40 by receiving the information corresponding to the interface of the liquid lens.

The second input part may receive temperature information of the liquid lens. That is, the second input part may be connected to the temperature sensor TS and may receive temperature information of the liquid lens 280 from the temperature sensor TS.

The data part may store a plurality of first driving signals for each temperature for a first diopter of the liquid lens 280 and a plurality of second driving signals for each temperature for a second diopter of the liquid lens 280. In this case, the first diopter and the second diopter are different from each other and are each a diopter of the interface of the liquid lens.

In addition, the data part may store two or more driving signals for each temperature for two or more of the same diopters.

For example, the data part may store a driving signal (for example, a first driving signal) at 25 degrees or 50 degrees for 2 diopters and a driving signal (for example, a second driving signal) at 30 degrees or 40 degrees for 15 diopters.

The first calculating unit may calculate a third diopter of the liquid lens using the information corresponding to the interface of the liquid lens. Specifically, the first calculating unit may calculate the third diopter which is initial diopter information using the information corresponding to the interface of the liquid lens. That is, the first calculating unit may provide information about a diopter desired by the external system 40. For example, when the information corresponding to the interface of the liquid lens is 110, it can be seen that 2 diopters corresponding to 110, which is the information corresponding to the interface of the liquid lens, are a diopter for the interface of the liquid lens 280 set in the external system 40 through the first calculating unit.

The second calculating unit may calculate feedback information corresponding to the temperature information and the third diopter using at least one of the first driving signal and the second driving signal of the data part. The feedback information may correspond to a driving signal which is a voltage code provided to the voltage controller and will be described below based thereon. In other words, the second calculating unit may compensate for a temperature to calculate feedback information (or a feedback driving signal, which will be used interchangeably below) for readjusting the interface of the liquid lens 280. Accordingly, the interface of the liquid lens 280 may have a diopter desired by the external system 40 due to the feedback driving signal.

For example, a driving signal allowing the interface of the liquid lens to have 8 diopters at 10° C. and a driving signal allowing the interface of the liquid lens to have 8 diopters at 30° C. may be different from each other. Accordingly, in the embodiment, a driving signal, which varies according to a temperature, may be output as the feedback driving signal for the interface of the liquid lens to have a desired diopter through the second calculating unit.

In addition, in the embodiment, the second calculating unit may calculate a third driving function for the plurality of first driving signals and a fourth driving function for the plurality of second driving signals. That is, the second calculating unit may calculate the third driving function and the fourth driving function on the basis of the driving signals for the same diopter of the data part. Each of the third driving function and the fourth driving function may be a linear function (that is, a temperature is an independent variable, and the driving signal is a dependent variable) of the driving signal (digital code) for a temperature at a corresponding diopter. This will be described in detail below. In addition, in the liquid lens, since the digital code (driving function value) according to a temperature and the digital code for a diopter are substantially linear, the camera module according to the embodiment may improve accuracy of a diopter by compensating for a temperature using such a linear function.

In addition, the second calculating unit may calculate a plurality of fifth driving functions for each temperature from the third driving function and the fourth driving function. In this case, the fifth driving function may be a linear function of the driving signal (digital code) for diopter. In addition, the fifth driving function may be calculated for each temperature. That is, the plurality of fifth driving functions may be calculated and the plurality of fifth driving functions may be different from each other according to a temperature, which will be described in detail below.

In addition, the second calculating unit may calculate the fifth driving function using at least one of the third driving function, the fourth driving function. This will be described in detail below.

In addition, the second calculating unit may also calculate a second driving function which is a digital code for a temperature for each diopter using a plurality of first driving functions. Next, the lens assembly 220 may include the liquid lens module 240, and the liquid lens module 240 may include the driving voltage providing unit 270 and the liquid lens 280.

In addition, the driving voltage providing unit 270 may receive a driving voltage from the voltage controller 232 and provide the driving voltage to the liquid lens 280.

The driving voltage providing unit 270 may include a voltage adjusting circuit (not shown) for compensating for a loss due to connection between terminals of the control circuit 210 and the lens assembly 220 or a noise canceling circuit (not shown) or may allow a voltage provided from the voltage controller 232 to bypass to the liquid lens 280. Alternatively, the driving voltage providing unit 270 is positioned in the control unit 230 to provide a voltage to the liquid lens 280.

Accordingly, the liquid lens 280 may perform at least one of an AF function and an OIS function. In the embodiment, in the liquid lens 280, a shape of an interface between a first liquid and a second liquid may be changed according to a driving voltage corresponding to a driving signal generated when the OIS function is performed. In addition, in the embodiment, in the liquid lens 280, the shape of the interface between the first liquid and the second liquid may be changed according to a driving voltage corresponding to a compensated second driving signal generated by compensating for a temperature. Accordingly, the camera module according to the embodiment may easily solve a problem of accuracy and resolution degradation occurring according to a temperature. In addition, at least one of an OIS function, an AF function, and a temperature compensation function may also be performed (two or more of the OIS function, the AF function, and the temperature compensation functions may also be performed at the same time).

The external system 40 may transmit a driving signal which is a digital code to the voltage controller 232. As described above, the external system 40 may be positioned outside the camera module. For example, the external system 40 may be positioned on a terminal and may include a controller and the like. In addition, the external system 40 may be connected to the camera module through an I2C communication method described above. However, the present invention is not limited thereto, the external system 40 may be connected to the camera module through another communication method instead of the I2C communication method.

Terms such as "unit" used in the present embodiment refer to software or a hardware component such as a field-programmable gate array (FPGA) or an application-specific integrated circuit (ASIC), and objects termed "unit" perform certain roles. However, the term "unit" is not limited to software or hardware. A "unit" may be configured to reside on an addressable storage medium or to reproduce one or more processors. Thus, in an example, the term "unit" includes components such as software components, object-oriented software components, class components, task components, processes, functions, properties, procedures, subroutines, segments of program code, drivers, firmware, micro-code, circuits, data, databases, data structures, tables, arrays, and variables. Functions provided by these components and "units" may be combined into a smaller number of components and "units" or may be subdivided into additional components and "units." Furthermore, the components and "units" may also be implemented to reproduce one or more central processing units (CPUs) within a device or a security multimedia card.

Figure 9:
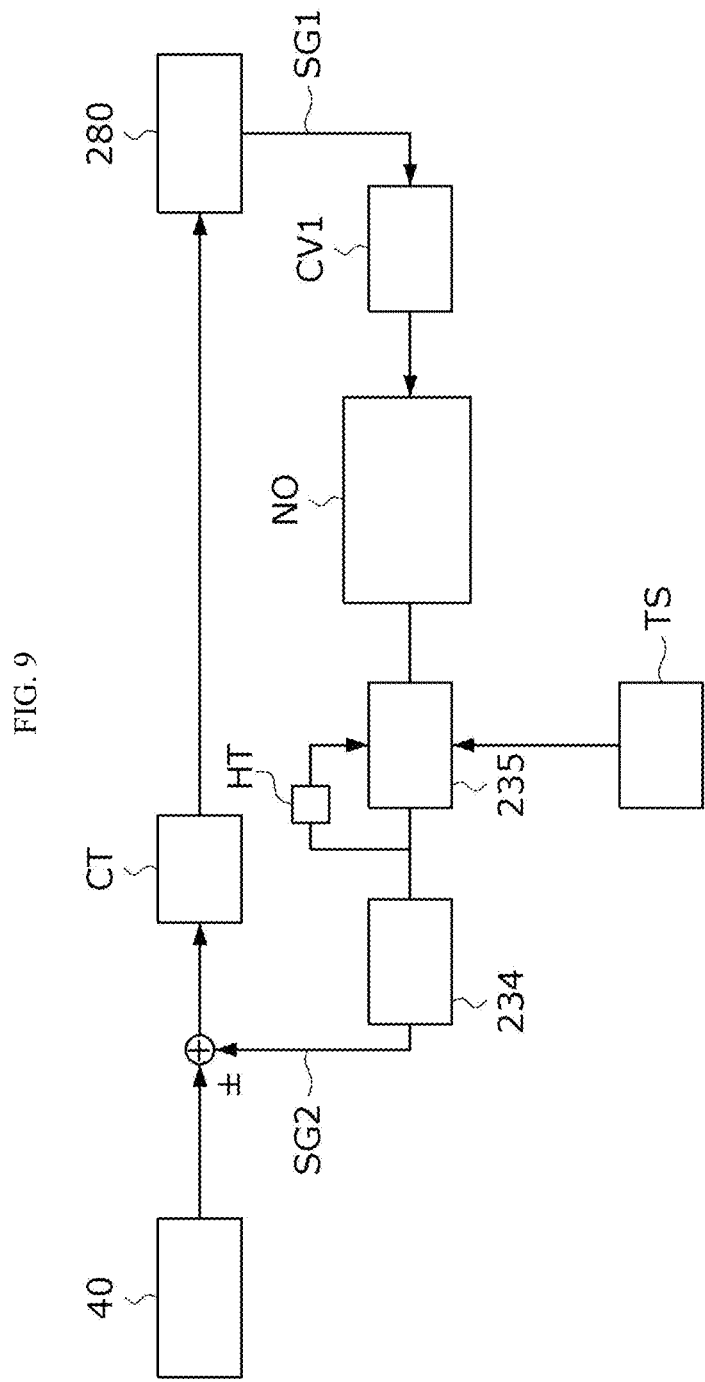
FIG. 9 is a view for describing driving of a control unit according to the embodiment.

FIG. 9 is a view for describing driving of the control unit according to the embodiment. Referring to FIG. 9, the control unit may generate a driving signal according to a diopter input from the external system 40. In the embodiment, the driving signal may be applied to the liquid lens 280 through a proportional-integral-derivative (PID) controller CT. As described above, the driving signal may be changed to a driving voltage, and the changed driving voltage may be applied to individual terminals of the liquid lens 280 so that the interface of the liquid lens 280 may be changed to have a diopter desired by the external system 40.

However, as described above, the interface of the liquid lens may have a diopter different from a diopter desired by the external system 40 according to a temperature of the liquid lens.

Accordingly, the control unit may detect information corresponding to the interface of the liquid lens from a capacitor of the liquid lens 280. Specifically, an analog voltage signal SG1 detected through the capacitor may be changed to the information corresponding to the interface of the liquid lens through an analog-digital converter CV1. Accordingly, the above-described sensing unit may include the analog-digital converter CV1.

Next, the control unit may change the information corresponding to the interface of the liquid lens to any of various representative values through a compression part NO. For example, the representative value may be an average value of driving signals for individual electrodes. Accordingly, the control unit according to the embodiment can improve a data processing speed and a calculation speed by processing the driving signals for the individual electrodes at once.

In addition, the compensation unit may receive information of the temperature sensor TS and information corresponding to the interface of the liquid lens and generate a feedback driving signal SG2 as described above. In addition, the feedback driving signal SG2 may be applied to the liquid lens 280, and deformation of the interface according to a temperature may be compensated for.

FIGS. 10 to 14 are views for describing driving of the compensation unit according to the embodiment.

Figure 10:
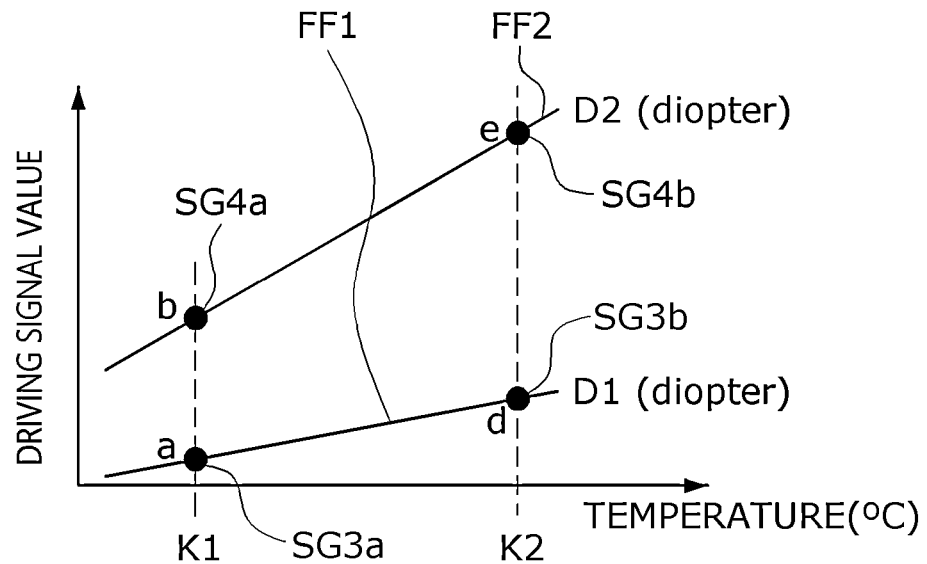
FIGS. 10 to 14 are views for describing driving of a compensation unit according to the embodiment.

Referring to FIG. 10, the compensation unit (second calculating unit) according to the embodiment may generate a first driving function FF1 and a second driving function FF2 from first driving signals SG3a and SG3b and second driving signals SG4a and SG4b of the data part. In addition, hereinafter, values a, b, d, e, x, y, h, i, f, and g may be digital codes (driving signal values).

Specifically, the first driving signals SG3a and SG3b are digital codes at different temperatures K1 and K2 for a first diopter D1, and the first driving function FF1 is a linear function of the digital code (driving signal value) for the temperature at the first diopter D1.

In addition, the second driving signals SG4a and SG4b are digital codes at the different temperatures K1 and K2 for a second diopter D2, and a second driving function FF2 is a linear function of the digital code for the temperature at the second diopter D2. In this case, the temperatures corresponding to the first driving signals SG3a and SG3b and the temperatures corresponding to the second driving signals SG4a and SG4b may be different from each other or partially the same.

Figure 11:
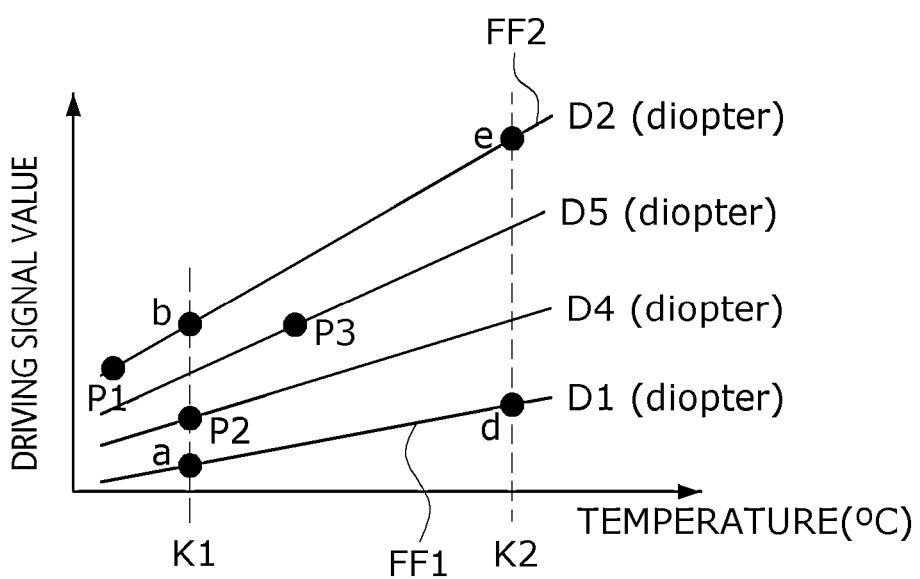
Figure 13:
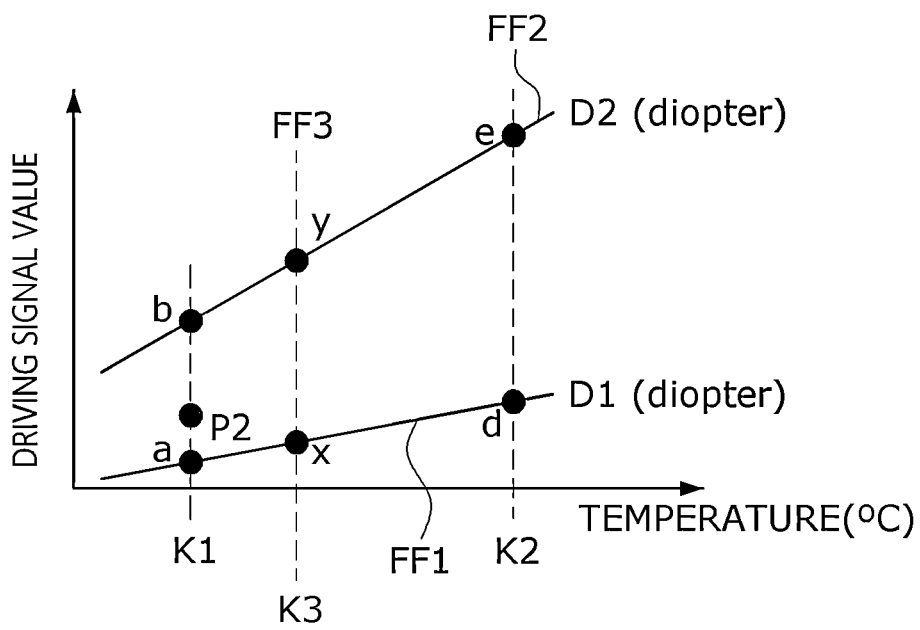

Referring to FIGS. 11 and 13, the compensation unit may calculate a first feedback driving signal P1 using the second driving function FF2. As an example, the first feedback driving signal P1 is positioned on the second driving function FF2, and the second driving function FF2 may be calculated as a linear function (for example, a first-order function) for the second driving signals SG4a and SG4b as described above. In addition, the compensation unit (or the second calculating unit) may calculate a driving signal value corresponding to a third diopter (the second diopter D2 based on the first feedback driving signal P1) calculated by the first calculating unit and a temperature (having a value less than a value of the temperature K1, see FIG. 11) detected from the temperature sensor as the first feedback driving signal P1. Accordingly, the interface of the liquid lens may operate with the second diopter D2.

In addition, the compensation unit may calculate a plurality of third driving functions FF3 for each temperature from the first driving function FF1 and the second driving function FF2.

In the embodiment, as in FIG. 10, when the first driving signals SG3a and SG3b and the second driving signals SG4a and SG4b are driving signal values for the same temperatures, the compensation unit may calculate the third driving function using the first driving signal and the second driving signal.

That is, the compensation unit may calculate the third driving function using driving signal values a and b of the first driving signal and the diopters D1 and D2, and driving signal values d and e of the second driving signal and the diopters D1 and D2. For example, the compensation unit may calculate the third driving function as a linear function of a driving signal for a diopter at the temperature K1 using the driving signal values a and b of the first driving signal and the diopters (the first diopter D1 and the second diopter D2).

In the embodiment, the compensation unit may calculate a second feedback driving signal P2 using the third driving function. As an example, the second feedback driving signal P2 may be positioned on the third driving function, and the compensation unit (or the second calculating unit) may calculate a driving signal value corresponding to the third diopter (a fourth diopter D4 based on a 2-2 driving signal P2) calculated by the first calculating unit and a temperature (the temperature K1, see FIG. 11) detected by the temperature sensor as the second feedback driving signal P2. Accordingly, the interface of the liquid lens may operate with the fourth diopter D4.

Figure 12:
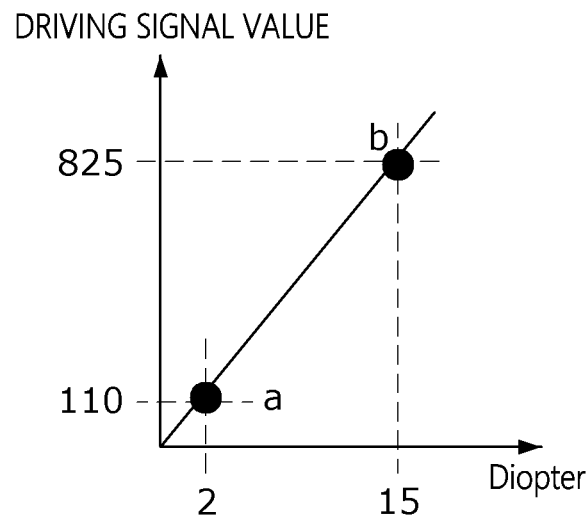

Referring to FIG. 12, for example, an inclination of the third driving function may be determined by values of changes in diopter and driving signal value, and the intercept thereof may be expressed as $((15-2)*a)/(2*(b-a))$.

Referring to FIG. 13, the third driving function may be calculated using a driving signal value calculated from the first driving function FF1 at a specific temperature and a driving signal value calculated from the second driving function FF2 at a specific temperature.

That is, the compensation unit may calculate a driving function value x at a temperature K3 for the first diopter D1 from the first driving function FF1 and a driving function value y at the temperature K3 for the second diopter D2 from the second driving function FF2.

Accordingly, the compensation unit may calculate the third driving function using the driving signal values x and y of the first driving signal and the diopters (the first diopter D1 and the second diopter D2) as a linear function of a driving signal at the temperature K3 for a diopter. Similarly, the compensation unit may calculate the plurality of third driving functions. In addition, as described above, the plurality of third driving functions may be linear functions of driving signals at various temperatures for diopters. In addition, the compensation unit may calculate the second driving function by applying the third diopter and a temperature to the third driving functions.

Figure 14:
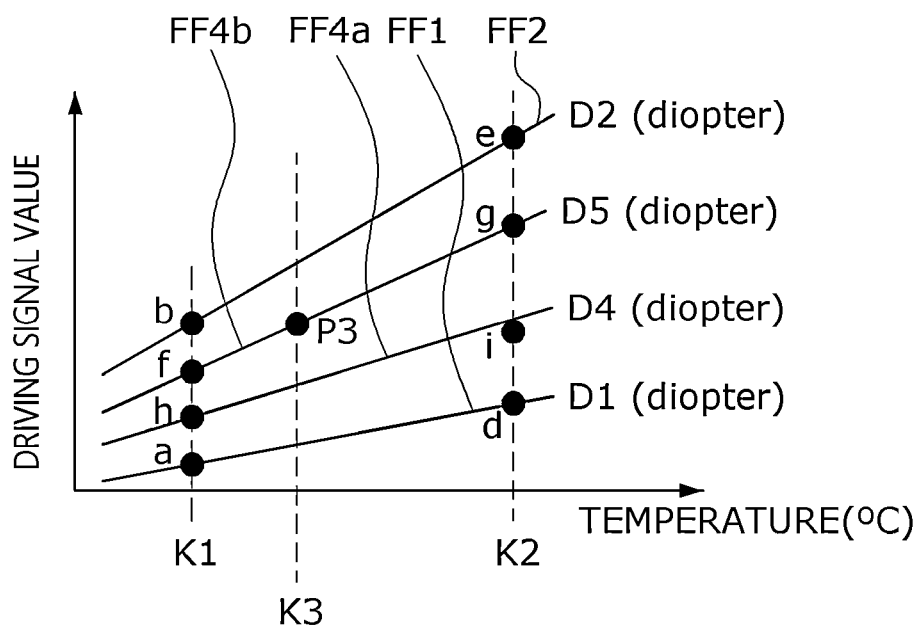

Referring to FIG. 14, the compensation unit may calculate driving function values h, i, f, and g for a fourth diopter D4 and a fifth diopter D5 through the third driving function. Specifically, the compensation unit may calculate the driving function values h, i, f, and g through the third driving function and calculate fourth driving functions FF4a and FF4b which are linear signals of driving signal values at the same diopter (the fourth diopter D4 or fifth diopter D5) for a temperature using the calculated driving function values h, i, f, and g.

Accordingly, the compensation unit may calculate a driving signal value at the temperature K3 for the fifth diopter D5 using the driving signal values h, f, i, and g of the first driving signal and the diopters (the fourth diopter D4 and the fifth diopter D5) as a third feedback driving signal P3.

The invention claimed is:

1. A camera module comprising:
    a lens assembly including a liquid lens including a first liquid and a second liquid that form an interface therebetween;
    a voltage controller that applies a driving signal to the liquid lens to adjust the interface;
    a temperature sensor that detects temperature information of the liquid lens;
    an image sensor that receives light passing through the lens assembly;
    a sensing unit that detects information corresponding to the interface of the liquid lens; and
    a compensation unit that outputs feedback information to the voltage controller using the information corresponding to the interface of the liquid lens and the temperature information,
    wherein the compensation unit includes:
        a first input part that receives the information corresponding to the interface;
        a second input part that receives the temperature information; and
        a data part that stores a plurality of first driving signals for a first diopter of the liquid lens for each temperature and a plurality of second driving signals for a second diopter of the liquid lens for each temperature;
    wherein the camera module comprises:
        a first calculating unit that calculates a third diopter of the liquid lens using the first driving signal; and
        a second calculating unit that calculates the feedback information corresponding to the temperature information and the third diopter using at least one of the plurality of first driving signals and the plurality of second driving signals,
    wherein the second calculating unit calculates a first driving function for the plurality of first driving signals and a second driving function for the plurality of second driving signals, and
    wherein the second calculating unit calculates a plurality of third driving functions for each temperature from the first driving function and the second driving function.

2. The camera module of claim 1, wherein the first diopter and the second diopter are different from each other.

3. The camera module of claim 1, wherein the second calculating unit calculates the feedback information using at least one of the first driving function, the second driving function, and the plurality of third driving functions.

4. The camera module of claim 1, wherein the second calculating unit calculates a fourth driving function that is a digital code for a temperature for each diopter using the plurality of third driving functions.

5. The camera module of claim 4, wherein the fourth driving function is provided as a plurality of fourth driving functions and is a linear function.

6. The camera module of claim 1, wherein the first driving function and the second driving function are linear functions.

7. The camera module of claim 1, wherein the liquid lens includes:
    a plate including a cavity in which the first liquid and the second liquid are disposed with the interface formed therebetween, wherein the first liquid is conductive and the second liquid is nonconductive;
    a common terminal disposed on the plate; and
    a plurality of individual terminals disposed under the plate,
wherein the information corresponding to the interface of the liquid lens includes voltages or an average voltage applied to the plurality of individual terminals.

* * * * *